United States Patent
Cameron et al.

(10) Patent No.: US 12,271,491 B2
(45) Date of Patent: Apr. 8, 2025

(54) DETECTION AND MITIGATION OF MACHINE LEARNING MODEL ADVERSARIAL ATTACKS

(71) Applicant: Citibank, N.A., New York, NY (US)

(72) Inventors: William Franklin Cameron, Jacksonville, FL (US); Pramod Goyal, Ahmedabad (IN); Prithvi Narayana Rao, Allen, TX (US); Manjit Rajaretnam, Irving, TX (US); Miriam Silver, Tel Aviv (IL)

(73) Assignee: CITIBANK, N.A.

( * ) Notice: Subject to any disclaimer, the term of this patent is extended or adjusted under 35 U.S.C. 154(b) by 0 days.

(21) Appl. No.: 18/923,655

(22) Filed: Oct. 22, 2024

(65) Prior Publication Data
US 2025/0053664 A1    Feb. 13, 2025

Related U.S. Application Data

(63) Continuation-in-part of application No. 18/792,523, filed on Aug. 1, 2024, which is a continuation-in-part of application No. 18/607,141, filed on Mar. 15, 2024, which is a continuation-in-part of application No. 18/399,422, filed on Dec. 28, 2023, which is a continuation of application No. 18/327,040, filed on May 31, 2023, now Pat. No. 11,874,934, which is a continuation-in-part of application No. 18/114,194, filed on Feb. 24, 2023, now Pat. No. 11,763,006, which is a continuation-in-part of application No.
(Continued)

(51) Int. Cl.
*G06F 21/57*    (2013.01)
*G06F 21/55*    (2013.01)

(52) U.S. Cl.
CPC .......... *G06F 21/577* (2013.01); *G06F 21/552* (2013.01)

(58) Field of Classification Search
CPC .......................... G06F 21/577; G06F 21/552
See application file for complete search history.

(56) References Cited

U.S. PATENT DOCUMENTS

| | | |
|---|---|---|
| 8,380,817 B2 | 2/2013 | Okada |
| 8,387,020 B1 | 2/2013 | Maclachlan et al. |
| 10,620,988 B2 | 4/2020 | Lauderdale et al. |

(Continued)

FOREIGN PATENT DOCUMENTS

WO    2021160499 A1    8/2021

OTHER PUBLICATIONS

"Coalition for Content Provenance and Authenticity, Contents Credentials C2PA Technological Specification", v2.1, Sep. 20, 2024. (Year: 2024).*

(Continued)

*Primary Examiner* — Darren B Schwartz
(74) *Attorney, Agent, or Firm* — Perkins Coie LLP

(57) ABSTRACT

Described herein are systems and methods for verifying the integrity of data, such as data used for training machine learning models. Some implementations are directed to verifying the provenance of datasets, the contents of datasets, or both. In some implementations, multiple filters are selected for verifying the contents of datasets. Filters can be selected based on rules, random selection, or using a machine learning model in some implementations. In some implementations, data cleaning is provided.

20 Claims, 13 Drawing Sheets

Related U.S. Application Data

18/098,895, filed on Jan. 19, 2023, now Pat. No. 11,748,491.

(56) References Cited

U.S. PATENT DOCUMENTS

| | | | |
|---|---|---|---|
| 10,943,067 B1* | 3/2021 | Brown | G06F 40/279 |
| 11,042,647 B1 | 6/2021 | Joyce et al. | |
| 11,133,942 B1 | 9/2021 | Griffin | |
| 11,227,187 B1* | 1/2022 | Weinberger | G10L 15/19 |
| 11,328,068 B1 | 5/2022 | Niedzwiedz et al. | |
| 11,410,136 B2 | 8/2022 | Cook et al. | |
| 11,516,222 B1 | 11/2022 | Srinivasan et al. | |
| 11,706,241 B1 | 7/2023 | Cross et al. | |
| 11,720,686 B1 | 8/2023 | Cross et al. | |
| 11,734,418 B1 | 8/2023 | Epstein | |
| 12,028,368 B1* | 7/2024 | Cohen | G06F 21/577 |
| 12,135,949 B1 | 11/2024 | Cameron et al. | |
| 12,149,553 B1 | 11/2024 | Fly et al. | |
| 12,149,558 B1 | 11/2024 | Brown et al. | |
| 12,155,781 B1 | 11/2024 | Helfgott et al. | |
| 12,182,258 B2* | 12/2024 | Stokes, III | G06N 5/022 |
| 2003/0007178 A1 | 1/2003 | Jeyachandran et al. | |
| 2004/0098454 A1 | 5/2004 | Trapp et al. | |
| 2005/0204348 A1 | 9/2005 | Horning et al. | |
| 2006/0095918 A1 | 5/2006 | Hirose | |
| 2007/0067848 A1 | 3/2007 | Gustave et al. | |
| 2010/0275263 A1 | 10/2010 | Bennett et al. | |
| 2010/0313189 A1 | 12/2010 | Beretta et al. | |
| 2014/0137257 A1 | 5/2014 | Martinez et al. | |
| 2014/0258998 A1 | 9/2014 | Adl-tabatabai et al. | |
| 2017/0061132 A1 | 3/2017 | Hovor et al. | |
| 2017/0295197 A1 | 10/2017 | Parimi et al. | |
| 2018/0020021 A1 | 1/2018 | Gilmore et al. | |
| 2018/0239903 A1 | 8/2018 | Bodin et al. | |
| 2018/0343114 A1 | 11/2018 | Ben-ari | |
| 2019/0188706 A1 | 6/2019 | Mccurtis | |
| 2019/0236661 A1 | 8/2019 | Hogg et al. | |
| 2019/0286816 A1 | 9/2019 | Fu | |
| 2020/0012493 A1 | 1/2020 | Sagy | |
| 2020/0074470 A1 | 3/2020 | Deshpande et al. | |
| 2020/0153855 A1 | 5/2020 | Kirti et al. | |
| 2020/0219009 A1* | 7/2020 | Dao | H04L 9/3247 |
| 2020/0233979 A1* | 7/2020 | Tahmasebi Maraghoosh | G06N 3/04 |
| 2020/0259852 A1 | 8/2020 | Wolff et al. | |
| 2020/0309767 A1 | 10/2020 | Loo et al. | |
| 2020/0314191 A1 | 10/2020 | Madhavan et al. | |
| 2020/0349054 A1 | 11/2020 | Dai et al. | |
| 2020/0380118 A1* | 12/2020 | Miller | G06N 3/045 |
| 2020/0387608 A1* | 12/2020 | Miller | G06N 3/04 |
| 2021/0049288 A1 | 2/2021 | Li | |
| 2021/0089941 A1* | 3/2021 | Chen | G06N 5/04 |
| 2021/0133182 A1 | 5/2021 | Anderson et al. | |
| 2021/0185094 A1 | 6/2021 | Waplington et al. | |
| 2021/0211431 A1 | 7/2021 | Albero et al. | |
| 2021/0256125 A1* | 8/2021 | Miller | G06F 21/566 |
| 2021/0264547 A1 | 8/2021 | Li | |
| 2021/0273957 A1 | 9/2021 | Boyer et al. | |
| 2021/0390465 A1 | 12/2021 | Werder et al. | |
| 2022/0050928 A1* | 2/2022 | Shukla | G06N 20/00 |
| 2022/0114251 A1 | 4/2022 | Guim Bernat et al. | |
| 2022/0147636 A1 | 5/2022 | Mahuli et al. | |
| 2022/0286438 A1 | 9/2022 | Burke et al. | |
| 2022/0294789 A1 | 9/2022 | Tikhomirov et al. | |
| 2022/0334818 A1 | 10/2022 | Mcfarland | |
| 2022/0398149 A1 | 12/2022 | Mcfarland et al. | |
| 2022/0417274 A1 | 12/2022 | Madanahalli et al. | |
| 2023/0032686 A1 | 2/2023 | Williams et al. | |
| 2023/0035321 A1 | 2/2023 | Vijayaraghavan | |
| 2023/0052608 A1 | 2/2023 | Wattiau et al. | |
| 2023/0067128 A1 | 3/2023 | Engelberg et al. | |
| 2023/0071264 A1 | 3/2023 | Hakala et al. | |
| 2023/0076372 A1 | 3/2023 | Engelberg et al. | |
| 2023/0077527 A1 | 3/2023 | Sarkar | |
| 2023/0114719 A1 | 4/2023 | Thomas et al. | |
| 2023/0117962 A1 | 4/2023 | Kaimal et al. | |
| 2023/0118388 A1 | 4/2023 | Crabtree et al. | |
| 2023/0123314 A1 | 4/2023 | Crabtree et al. | |
| 2023/0132703 A1 | 5/2023 | Marsenic et al. | |
| 2023/0135660 A1 | 5/2023 | Chapman et al. | |
| 2023/0148116 A1* | 5/2023 | Stokes, III | G06F 21/552 726/23 |
| 2023/0169397 A1* | 6/2023 | Smith | G06F 21/57 706/12 |
| 2023/0205888 A1 | 6/2023 | Tyagi et al. | |
| 2023/0205891 A1 | 6/2023 | Yellapragada et al. | |
| 2023/0208869 A1 | 6/2023 | Bisht et al. | |
| 2023/0208870 A1 | 6/2023 | Yellapragada et al. | |
| 2023/0208871 A1 | 6/2023 | Yellapragada et al. | |
| 2023/0229542 A1 | 7/2023 | Watkins et al. | |
| 2023/0259860 A1 | 8/2023 | Sarkar | |
| 2023/0269272 A1 | 8/2023 | Dambrot et al. | |
| 2023/0274003 A1* | 8/2023 | Liu | G06N 3/094 726/26 |
| 2023/0362200 A1 | 11/2023 | Crabtree et al. | |
| 2023/0396641 A1 | 12/2023 | Hebbagodi et al. | |
| 2023/0412635 A1 | 12/2023 | Binyamini et al. | |
| 2024/0054233 A1* | 2/2024 | Ohayon | G06F 21/577 |
| 2024/0054249 A1* | 2/2024 | Loubet Moundi | G06V 40/10 |
| 2024/0256678 A1 | 8/2024 | Thompson | |
| 2024/0364749 A1 | 10/2024 | Crabtree et al. | |
| 2024/0403428 A1 | 12/2024 | Lal et al. | |
| 2024/0403437 A1 | 12/2024 | Szigeti et al. | |
| 2024/0403445 A1 | 12/2024 | Straub et al. | |
| 2024/0406145 A1 | 12/2024 | Crabtree et al. | |
| 2024/0411896 A1 | 12/2024 | Myers et al. | |
| 2024/0414211 A1 | 12/2024 | Boyer et al. | |

OTHER PUBLICATIONS

Stokes, et al. "Preventing Machine Learning Poisoning Attacks Using Authentication and Provenance", Milcom 2021—2021 IEEE Military Communications Conference (Milcom), 2021, pp. 181-188. (Year: 2021).*

AI Risk Management Framework NIST, retrieved on Jun. 17, 2024, https://www.nist.gov/itl/ai-risk-management-framework.

Independent analysis of AI language models and API providers. Artificial Analysis, retrieved on Jun. 13, 2024, https://artificialanalysis.ai/, 11 pages.

What is AI Verify?, AI Verify Foundation, Jun. 11, 2024, 3 pages, https://aiverifyfoundation.sg/.

Brown, D., et al., "The Great AI Challenge: We Test Five Top Bots on Useful, Everyday Skills," The Wall Street Journal, published May 25, 2024.

Cranium, Adopt & Accelerate AI Safely, retrieved on Nov. 7, 2024, from https://cranium.ai/.

Dong, Y., et al., "Building Guardrails for Large Language Models," https://ar5iv.labs.arxiv.org/html/2402.01822v1, published May 29, 2024, 20 pages.

Futurism, "Sam Altman Admits That OpenAI Doesn't Actually Understand How Its AI Works", Jun. 11, 2024, 4 pages, https://futurism.com/sam-altman-admits-openai-understand-ai.

International Search Report and Written Opinion Received received in Application No. PCT/US23/85942, dated Feb. 15, 2024, 6 pages.

Kojima, Takeshi, et al. "Large Language Models are Zero-Shot Reasoners," 36th Conference on Neural Information Processing Systems (NeurIPS 2022), arXiv:2205.11916 [cs.CL], Jan. 29, 2023, 42 pages.

Mavrepis, P., et al., "XAI for All: Can Large Language Models Simplify Explainable AI?," https://arxiv.org/abs/2401.13110, Jan. 23, 2024, 10 pages.

Wei, Jason, et al. "Chain-of-Thought Prompting Elicits Reasoning in Large Language Models," 36th Conference on Neural Information Processing Systems (NeurIPS 2022), arXiv:2201.11903 [cs.CL], Jan. 10, 2023, 43 pages.

Zhao, H., et al., "Explainability for Large Language Models: A Survey," https://arxiv.org/abs/2309.01029, Nov. 28, 2024, 38 pages.

Aggarwal, Nitin, "Why measuring your new AI is essential to its success", KPIs for gen AI: Why measuring your new AI is essential to its success, 7 pages.

(56) References Cited

OTHER PUBLICATIONS

Anthrop/C, "Mapping the Mind of a Large Language Model", Mapping the Mind of a Large Language Model, May 21, 2024.
Claburn, Thomas, "OpenAI's GPT-4 can exploit real vulnerabilities by reading security advisories", OpenAI's GPT-4 can exploit real vulnerabilities by reading security advisories, Apr. 17, 2024, 3 pages.
Marshall, Andrew, "Threat Modeling AI/ML Systems and Dependencies", Threat Modeling AI/ML Systems and Dependencies, Nov. 2, 2022, 27 pages.
Roose, Kevin, "A.I. Has a Measurement Problem", A.I. Has a Measurement Problem, Apr. 15, 2024, 5 pages.
Roose, Kevin, "A.I.'s Black Boxes Just Got a Little Less Mysterious", A.I.'s Black Boxes Just Got a Little Less Mysterious, May 21, 2024, 5 pages.
Shah, Harshay, "Decomposing and Editing Predictions by Modeling Model Computation", Decomposing and Editing Predictions by Modeling Model Computation, 5 pages.
Shankar, Ram, "Failure Modes in Machine Learning", Nov. 2019, 14 pages.
Teo, Josephine, "Singapore launches Project Moonshot", Singapore launches Project Moonshot—a generative Artificial Intelligence testing toolkit to address LLM safety and security challenges, May 31, 2024, 8 pages.
Farris, K., A., et al., "VULCON: A System for Vulnerability Prioritization, Mitigation, and Management," ACM Transactions on Privacy and Security, vol. 21, No. 4, Article 16. Publication date: Jun. 2018, 28 pages.

\* cited by examiner

| Data Nutrition Label | Data 1 | Data 2 | Data 3 |
|---|---|---|---|
| Overall | ● | ■ | ▲ |
| Hash | ● | ● | ▲ |
| Signature | N/A | ● | N/A |
| Latency | ● | ■ | ● |
| Comparison | ● | ● | ● |

| ● | ■ | ▲ |
|---|---|---|
| Low | Medium | High |

FIG. 6

| Data Nutrition Label | Data 1 | Data 2 | Data 3 |
|---|---|---|---|
| Overall | | | |
| Assessed | ● | ■ | ▲ |
| Mitigated | ● | ● | ■ |
| Indiscriminate | | | |
| Assessed | ● | ● | ▲ |
| Mitigated | ● | ● | ■ |
| Targeted | | | |
| Assessed | ● | ■ | ● |
| Mitigated | ● | ● | ● |
| ▲ Low | | ■ Medium | ● High |

FIG. 12

DETECTION AND MITIGATION OF MACHINE LEARNING MODEL ADVERSARIAL ATTACKS

CROSS-REFERENCE TO RELATED APPLICATIONS

This application is a continuation in part of U.S. patent application Ser. No. 18/792,523, entitled "GENERATIVE CYBERSECURITY EXPLOIT SYNTHESIS AND MITIGATION" filed on Aug. 1, 2024, which is a continuation-in-part of U.S. patent application Ser. No. 18/607,141 entitled "GENERATING PREDICTED END-TO-END CYBER-SECURITY ATTACK CHARACTERISTICS VIA BIFURCATED MACHINE LEARNING-BASED PROCESSING OF MULTI-MODAL DATA SYSTEMS AND METHODS" filed on Mar. 15, 2024, which is a continuation-in-part of U.S. patent application Ser. No. 18/399,422 entitled "PROVIDING USER-INDUCED VARIABLE IDENTIFICATION OF END-TO-END COMPUTING SYSTEM SECURITY IMPACT INFORMATION SYSTEMS AND METHODS" filed on Dec. 28, 2023, which is a continuation of U.S. patent application Ser. No. 18/327,040 (now U.S. Pat. No. 11,874,934) entitled "PROVIDING USER-INDUCED VARIABLE IDENTIFICATION OF END-TO-END COMPUTING SYSTEM SECURITY IMPACT INFORMATION SYSTEMS AND METHODS" filed on May 31, 2023, which is a continuation-in-part of U.S. patent application Ser. No. 18/114,194 (now U.S. Pat. No. 11,763,006) entitled "COMPARATIVE REAL-TIME END-TO-END SECURITY VULNERABILITIES DETERMINATION AND VISUALIZATION" filed Feb. 24, 2023, which is a continuation-in-part of U.S. patent application Ser. No. 18/098,895 (now U.S. Pat. No. 11,748,491) entitled "DETERMINING PLATFORM-SPECIFIC END-TO-END SECURITY VULNERABILITIES FOR A SOFTWARE APPLICATION VIA GRAPHICAL USER INTERFACE (GUI) SYSTEMS AND METHODS" filed Jan. 19, 2023. The content of the foregoing applications is incorporated herein by reference in its entirety.

BACKGROUND

When determining whether a computing platform (e.g., a cloud-based computing platform, a mobile computing platform, a remote computing platform) or computing system is secure (e.g., safe to use), information security engineers (e.g., network engineers) often rely on publicly available information regarding the computing platforms and systems, such as blog posts, news articles, and social media. However, this publicly available information can be filled with inaccuracies and may be outdated. For example, network engineers may be responsible for choosing the safest, fastest, and most scalable computing platform to provide services to another system. Of these factors, security of the computing platforms is of upmost importance as user data can be processed on such computing platforms and may be susceptible to a data breach if user data is not handled properly. As new security vulnerabilities are discovered by attackers in real-time, such vulnerabilities may be exploited and network engineers relying on publicly available information regarding the security of a computing platform may be unaware of the newly discovered security vulnerabilities as they are not published in the public domain.

Moreover, the process of using network engineers who employ manual techniques to determine whether the given computing platform or system is impacted by one or more security vulnerabilities often leads to errors and is based on subjective opinion of the engineer. As data relied upon for making such determinations takes time to publish, attackers may exploit user and system data in real-time. Additionally, although such engineers may subjectively determine security vulnerabilities of a given system, determining which vulnerabilities are most threatening is further complicated by differing opinions of network engineers. As a large amount of time and other resources devoted to correcting security vulnerabilities, where network engineers disagree on which vulnerabilities should be corrected first, the computing platform and/or system may continue to be exploited. Moreover, the advent of artificial intelligence can be used maliciously, which attackers leverage to prevent detections of new threats (e.g., via masking computing platform/system updates) that cause advanced techniques to detect advanced threats. Without a way to determine whether a given computing platform is secure at a given moment in time and which vulnerabilities are to be corrected over others, user data may be stolen, system data may be held for ransom, and computing networks may be injected with malicious software unbeknownst to the network engineers until it is too late. These and other drawbacks exist.

BRIEF DESCRIPTION OF THE DRAWINGS

FIG. 6 is a drawing that shows an example security label for data retrieval according to some implementations.

FIG. 12 is an example security label according to some embodiments.

Figure 1:
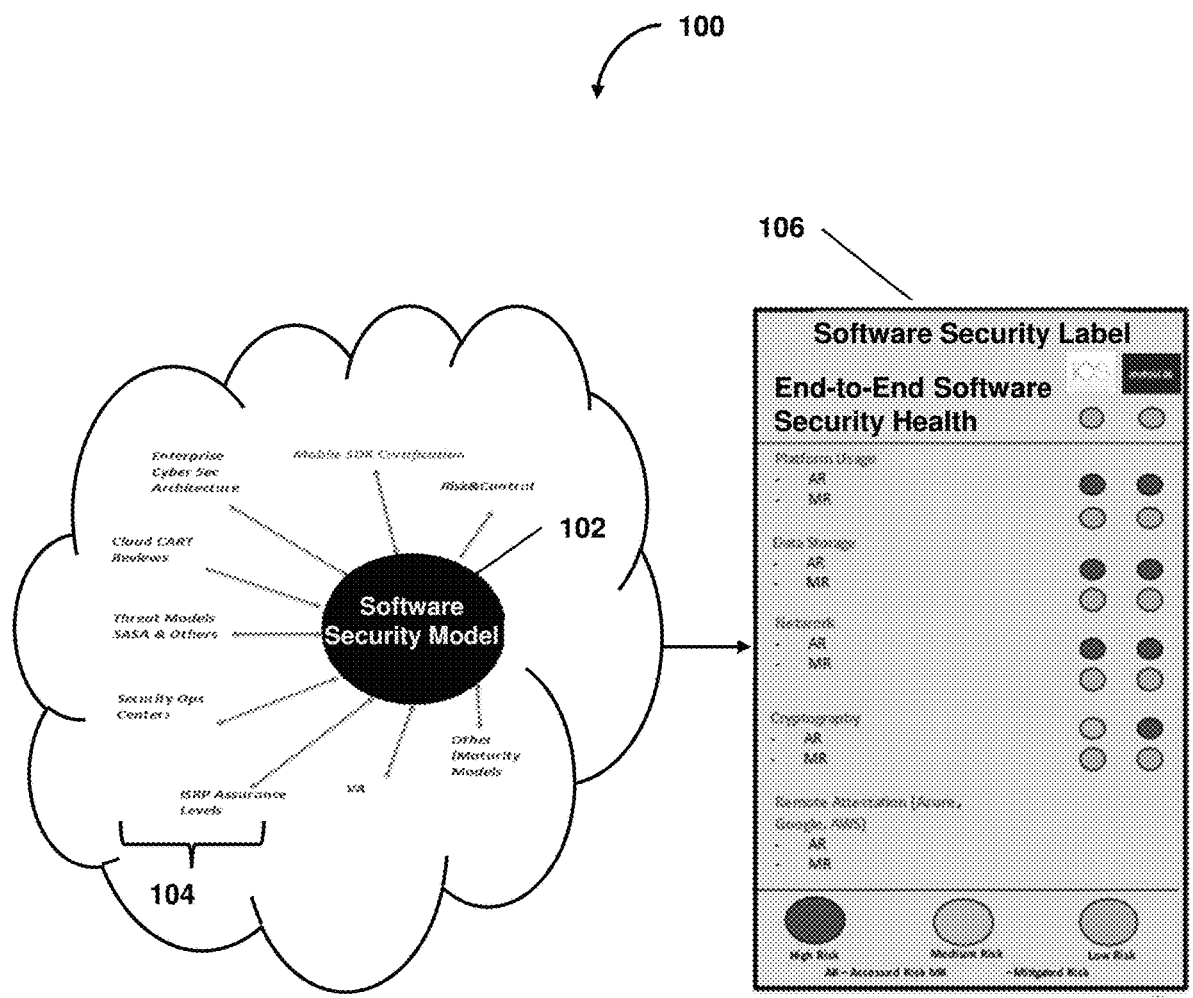
FIG. 1 is a block diagram showing an illustration of components used to determine platform-specific end-to-end security vulnerabilities and a graphical layout for displaying the platform-specific end-to-end security vulnerabilities via a Graphical User Interface (GUI).

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

As machine learning models become more pervasive and are used for increasingly important tasks such as making employment, financial, and healthcare decisions, adversarial attacks are of growing concern. For example, a malicious actor may try to manipulate a machine learning model used for making loan approval decisions to obtain a loan that should not be approved. As another example, a malicious actor may try to manipulate a fraud detection model to prevent a fraudulent transaction from being detected. In some cases, machine learning models are used for cybersecurity applications, such as detecting suspicious or malicious behavior by analyzing endpoint detection and response (EDR) data, extended detection and response (XDR) data, system logs, third party service logs (e.g., logs from an identity management service), etc. In some cases, machine learning models are used to inspect network traffic to identify potentially malicious activity. Thus, malicious actors have a strong motivation to attempt to subvert machine learning models. In general, a malicious actors may try to manipulate a model to cause the model to produce flawed/unexpected outputs. Manipulations can be aimed at achieving particular results or at making models less reliable generally.

Machine learning models can fail/perform abnormally because of adversarial attacks on the underlying algorithms, data, or both. Various intentional failure attacks exist, such as perturbation attacks, in which an actor modifies inputs to get a desired response; poisoning, in which an actor interferes with model training, for example by providing flawed or manipulated data; and model inversion, in which an actor learns the features used in the model by manipulating inputs and learning how they impact the outputs. Other types of attacks are also possible.

Poisoning attacks can target models during initial training or after deployment (e.g., when models are retrained). In a poisoning attack, an actor can provide flawed training data so that predictions on new data behave in a particular manner. Poisoning attacks can be targeted or indiscriminate. In an indiscriminate poisoning attack, an actor can provide training data that causes the model to perform poorly under a wide variety of circumstances, potentially rendering the model unusable. In a targeted attack, an actor can provide training data to manipulate how the model behaves when it receives particular inputs. Targeted attacks can be difficult to detect as the model may appear to be functioning normally under many circumstances, while it produces undesirable outputs when certain inputs are provided. Data poisoning can be carried out in various ways, such as by inverting labels on training data (e.g., to label a malicious file as benign or to label a denied loan application as approved) or by manipulating data to cause incorrect outputs. Different types of poisoning can be used depending upon a level of access an attacker has to training data. For example, label inversion may only be possible if the attacker has access to labeled training data. In many cases, an organization labels training data itself, which can make label inversion attacks impractical.

Poisoned data can impact initial model training, ongoing model training, or both. Depending on the model and use case, a machine learning model can be trained and deployed, and the model can remain fixed over time. This can be significant for ensuring that a model's performance remains consistent over time (e.g., that the same inputs continue to produce the same outputs) and can be important for certain applications, such as when models are used for regulated activities such as making or recommending financial or medical decisions, where explainability and/or consistency can be important. In other cases, a model can be configured for continuous learning. This can be important as a model can become less applicable to current conditions over time if the model is not retrained or tuned. For example, consider a model used for fraud detection in banking. If the model training is not updated, over time the model can become less effective as it has not been exposed to and trained using data reflective of new fraud patterns or techniques. As another example, a cybersecurity machine learning model may become less effective at detecting intruders or malware if the model is not trained on up-to-date tactics, techniques, and procedures (TTPs), vulnerabilities, exploits, etc. While ongoing training can be beneficial, it opens an attack vector that can be used to manipulate a model to cause the model to perform in a particular way. Thus, it is important to verify data used both during initial training and during continuous learning in cases where continuous learning is used to tune the model over time. In some implementations, thresholds are applied to classify outputs of a model, such as determining whether activity is malicious or benign. In some cases, thresholds can be dynamically adjusted. For example, a threat detection model can have a lower threshold during periods of low activity so that the model is more likely to detect threats, potentially with an increased risk of false detections, and can have a higher threshold during periods of high activity, so that false positives are less likely, though with possibly an increase in missed threats.

Training data can come from various sources and can be distributed in a variety of manners. For example, in some cases, a training dataset can be provided by a single source that maintains control over the dataset. As an example, Common Vulnerabilities and Exposures (CVE) data published by MITRE is generally tightly controlled. In some cases, a dataset may be less tightly controlled. For example, an image dataset may be too large to distribute the actual images, and the dataset can include URLs where the images can be accessed. Thus, anyone with control over one or more of the domains listed in the dataset can manipulate the data by substituting in different images. In some cases, data is scraped from the internet, leaving open the possibility that the data is manipulated. As an example, if a publicly-editable site such as Wikipedia is used for training, pages can be edited to include poisoned information, then potentially reverted back after the pages are scraped.

Various techniques for detecting and mitigating poisoned training data are described herein. These techniques can be used prior to or during initial training and/or integrated into continuous training or retraining processes.

In some implementations, a filter layer is included in a training process. The filter layer can be configured to test incoming data to determine whether the incoming data should be used for model training (e.g., whether or not the incoming data has been poisoned). The filter layer can use one or more filter techniques to evaluate candidate training data. In some implementations, a filter layer can include multiple layers. For example, filters can be grouped into relatively simple filters (e.g., having relatively low computational demands) and more complex filters with higher computational demands. In some implementations, relatively simple filters can be considered provenance filters and can include filtering based on, for example, hashes or file signatures, while more complex filters can be considered content filters and may perform inspection of the data itself, for example to identify outliers, clusters within the data, etc. In some implementations, provenance filters can be applied before content filters are applied. For example, in some implementations, content filters are applied only if a candidate training dataset is verified by one or more provenance filters.

Various techniques can be used to check the provenance of data, such as checking hashes, file signatures, certificates (e.g., a secure sockets layer/transport layer security (SSL/TLS) certificates), and so forth. For example, man-in-the-middle attacks can, in some cases, be detected if an invalid, mismatched, untrusted, and/or self-signed SSL/TLS certificate is detected. Verifying SSL/TLS certificates can reduce the likelihood that a man-in-the-middle attack is successful, although there is still potential for attacks to be missed.

In some implementations, a system can be configured to retrieve training data or other information (e.g., CVE data) from an external source. In some implementations, the system can compute a checksum or hash associated with the retrieved information. Various algorithms exist, such as MD5 and SHA (e.g., SHA-1, SHA-2, etc.) to compute hash values. In some implementations, MD5 hashes can be used to verify integrity or provenance; however, MD5 is known to have relatively weak collision resistance. That is, it is possible to have two different inputs (e.g., two different files) that have the same MD5 hash. In some implementations, SHA (e.g., SHA-2) can be preferred. SHA algorithms are typically more resistant to collisions and thus can be more suitable for critical operations such as verifying the provenance and/or integrity of training data. Some data providers may make hashes available to users. For example, hashes can be posted on a website, made available via an API, etc. In some implementations, a system can be configured to compute a hash value associated with a downloaded file and to compare the computed hash value to a hash value supplied by a data provider. If a difference is detected, this can indicate that the file was tampered with or may simply indicate that there was an error during transmission of the file. In some implementations, if a system detects a difference, the system can automatically redownload the file and determine a new hash value. If the hash value still differs from the hash value supplied by the data provider, the system can reject the file. In some implementations, when a system detects a difference in hash values, the system can generate an alert and/or take other actions, such as preventing the file from being used for training a machine learning model.

There can be many reasons that a hash value differs from that supplied by a data provider. Some of these reasons may be benign, such as file transmission errors as described above, or a process of updating a hash value on a website or in a database being skipped, broken, etc. In other cases, hashes may differ because a data source itself has been compromised, data has been compromised during transmission (e.g., a man-in-the-middle attack), or because a receiving device is infected with malware that modified the downloaded file. Thus, in some implementations, a hash difference can indicate that an organization's own systems are compromised.

While computing hash values and comparing them to values provided by a data supplier can offer some protection against tampering, such an approach is not foolproof. For example, an attacker who is able to compromise a file may also be able to compromise a hash value that is posted on a website, in which case comparing hash values may not indicate that a file has been tampered with.

In some cases, files can be digitally signed, which can help to verify the integrity and authenticity of a file. Digital signatures can use asymmetric cryptography to ensure that a file has not been modified and/or that it originates from a trusted source. However, digital signatures may, in some cases, be insufficient to detect tampering. For example, digital signatures rely on asymmetric cryptography, where a signer signs using a private key and a recipient verifies the signature using a corresponding public key. If the private key is compromised, an attacker may be able to sign compromised or malicious files using the private key. In some cases, an attacker may not need access to a private key but may instead use social engineering techniques to obtain digital signatures. For example, a malicious actor may dupe someone with access to a private key into signing an arbitrary file, for example by posing as another employee.

Hashing, signature verification, or SSL/TLS certificate verification can be valuable tools for verifying that received data has not been tampered with. In some implements, these techniques can be combined to improve resilience against malicious actors.

Other approaches are possible. For example, in some implementations, a system can record typical transfer speeds, latencies, etc., associated with retrieving certain information from external sources. Each time information is retrieved from an external source, the latency, transfer speed, etc., can be compared against historical values. If there is a significant difference (e.g., a significantly higher latency), this can indicate that, for example, a request to retrieve information from the external source was redirected from the real source to an alternative, potentially malicious source. While this can be a powerful technique, it can be subject to false positives, as differences may occur for various reasons, such as network outages, network congestion, being routed to a different content delivery server, etc.

Content filters can inspect the content of files (e.g., of candidate training data) to identify if the files have been manipulated (e.g., with poisoned training data). Content filtering techniques can include, for example, data validation, anomaly detection, model-based techniques, and so forth. Data validation techniques can include outlier detection, for example using statistical methods to identify data points that significantly deviate from observed norms. In some implementations, data validation includes consistency checking. For example, a system can be configured to check that data follows expected patterns and rules, such as valid ranges for numerical values, correct data formats, and so forth. In some implementations, other verification approaches may be used. For example, a system can be configured to compare a candidate training dataset to an earlier version of the candidate training dataset, in which case it can be expected that entries that appear in both the newly accessed candidate training data and the earlier version of the candidate training dataset. If the system detects a difference in an entry that exists in both the previous version and the newly accessed version, this can indicate that the newly accessed version has been compromised.

Anomaly detection can be performed using a machine learning algorithm, an ensemble of machine learning algorithms, other algorithms, or any combination thereof. For example, anomaly detection can be performed using a clustering algorithm (e.g., using a technique such as k-means clustering, density-based spatial clustering of applications with noise (DBSCAN), Gaussian mixture, balance iterative reducing and clustering using hierarchies (BIRCH), affinity propagation clustering). Clustering can be used to identify anomalies that do not fit well into any cluster or to detect new clusters not observed in previous datasets. In some implementations, autoencoders can be trained to reconstruct data, and data with high reconstruction errors can be identified as potentially anomalous. In some implementations, other techniques can be used additionally or alternatively, such as isolation forests, one-class state vector machines, or local outlier factor (LOF).

In some implementations, ensemble methods are used to detect poisoned data. For example, two models can be trained, and their predictions can be compared. If the predictions differ significantly (for example, as measured using statistical means), this can indicate poisoned training data. In some implementations, a system can use bagging, boosting, stacking, or similar techniques to improve detection accuracy.

In some implementations, a non-production copy of a machine learning algorithm is used to validate candidate training data. For example, a system can train the non-production copy using the candidate training data (either as a distinct training process or by applying the non-production copy to the candidate training data in the case of ongoing training), and the non-production copy can be evaluated to determine the impacts of the candidate training data. In some implementations, model weights and/or other model parameters are captured before and after processing the candidate training data. If the weights change unexpectedly or by more than a threshold amount, this can indicate that the candidate training data is poisoned. For example, a weight suddenly increasing can indicate that an input variable that was previously not considered very important is now considered very important by the algorithm. As another example, models often produce an output and an associated confidence level. If confidence levels drop significantly after training the non-production copy using the candidate training data, this can indicate that the candidate training data is poisoned. Metrics such as precision, recall, F1 score, and/or AUC/ROC can be used to evaluate the performance of anomaly detection models.

In some implementations, performance of the non-production model is evaluated according to one or more metrics such as root mean squared error (RMSE), root mean absolute error (RMAE), mean squared error, R-squared or adjusted R-squared (which can indicate the proportion of variance in a dependent variable that is explained by the model), P-values (which can indicate statistical significance of predictors and can serve as a confidence indicator), and so forth. Testing techniques can include, for example, k-fold cross-validation, leave-one-out cross-validation (LOOCV), and so forth. K-fold cross-validation and LOOCV can assess the impact of variables by partitioning data into various subsets (folds) and evaluating model performance across folds. In some implementations, techniques such as bootstrapping or holdout can be utilized additionally or alternatively.

Various modeling approaches can be used, such as similarity searches, clustering, and content-based models. Metrics can be compared between different models and/or different tunings of a model. It will be appreciated that no single metric is necessarily best for evaluating a model. For example, tuning can result in a positive improvement in one metric while lowering another metric. For example, raising precision (e.g., confidence in positive selections) can result in lower recall (e.g., more false negatives). The selection criteria for metrics can be based on the problem being analyzed. For example, in the case of identifying or analyzing security flaws, it can be better to have low precision (e.g., lower confidence that an issue is a real issue) and high recall (e.g., confidence that there are few false negatives). Another consideration is that decisions made in data selection can impact metrics and real-world performance. For example, it is possible to drive very positive metrics through data selection and training, but a model can become overfit and not generalized, resulting in poor real-world results. Thus, it can be important to consider a variety of metrics when evaluating models.

It can be important to achieve a balance between false positives and false negatives, as too many false alerts may desensitize users who receive alerts about potential security issues, while too many false negatives can result in significant compromises that are not detected until damage has been done.

The importance of different features of the candidate training data can be analyzed using techniques such as Shapley analysis, which can help to determine the contribution of each feature to the model's predictions; Bayesian balancing; covariance analysis; and so forth. Covariance analysis can be used to identify relationships between variables, identifying dependencies and correlations. Correlations between variables can be significant. For example, if two variables are typically strongly correlated in known-good training data but are uncorrelated or the correlation differs significantly in candidate training data, this can indicate that the candidate training data has been poisoned. In some implementations, techniques such as permutation feature importance or local interpretable model-agnostic explanations (LIME) can be used additionally or alternatively to analyze feature importance. In some implementations, statistical methods such as chi-squared testing or Kolmogorov-Smirnov testing can be used to validate data integrity.

As described herein, there are many techniques that can be used to evaluate candidate training data. While these techniques can be effective for detecting poisoned data, malicious actors can take measures to evade detection. Evasion techniques can be particularly effective if the malicious actor has some knowledge about how training data is verified. As an example, attackers can use strategies such as subtle poisoning, gradual poisoning, targeted poisoning, data distribution manipulation, noise injection, and so forth. In subtle poisoning, a malicious actor introduces small changes that are less likely to be detected. In gradual poisoning, poisoned data is introduced over time, for example over multiple training cycles, thereby making it harder to detect poisoned data. Targeted poisoning can involve poisoning specific subsets of data. For example, a malicious actor may poison specific subsets to cause a model to perform in an unexpected or erroneous manner when certain inputs are provided to the model. Targeted poisoning can be particular difficult to detect using certain techniques such as comparing confidence scores of machine learning models or evaluating error rates (else, false positive rates, false negative rates) of a model, as the model may perform as expected under most circumstances and only produce aberrant outputs when specific inputs are provided. As an example, researchers were able to poison a model such that stop signs with a yellow square attached to them were reliably misclassified as speed limit signs.

Poisoned data can be masked or obfuscated using techniques such as data distribution manipulation and noise injection. Data distribution manipulation involves manipulating poisoned data so that it matches the distribution of legitimate data, for example by using data augmentation to create poisoned data that appears consistent with legitimate data. Noise injection can be used to mask the presence of poisoned data and make it more difficult to identify true anomalies.

Recognizing a need to ensure that machine learning models used in critical business activities, security activities, and so forth work reliably, and recognizing that existing approaches, which are often non-existent or provide only limited protection against poisoning, are insufficient to protect machine learning models, the inventors undertook to discover approaches that can better ensure that poisoned data does not impact model performance.

One existing technique for combating poisoning is adversarial training, in which poisoned data is intentionally used during training. Adversarial training can enhance model robustness against adversarial attacks, but has several downsides including increased computational cost, reduced accuracy on clean data, and implementation complexity. Adversarial training often struggles with generalizing to unseen attacks and risks overfitting to specific adversarial examples. Balancing robustness and performance is challenging, and the process can be resource-intensive for large datasets.

As described herein, other approaches have several limitations, such as being limited in the types of data poisoning they can detect and being vulnerable to evasion techniques.

To overcome these challenges, the inventors experimented with various techniques to determine ways to better ensure the integrity of data used for training machine learning models. The approaches described herein are configured apply one filter or multiple filters to evaluate candidate training data. The filters can be applied based on pre-defined rules and/or using a machine learning model. For example, a machine learning model can be configured to classify or otherwise analyze the candidate training data and/or a target machine learning model (e.g., a model to be trained using the candidate training data), and one or more filters can be selected based on the outputs of the machine learning model. In some embodiments, filters are clustered, and a filter can be selected from a cluster, multiple filters can be selected from multiple clusters (e.g., one filter from each cluster), or multiple filters can be selected from a single cluster. The clusters can group similar filter techniques, though this is not necessary. Filters can be selected randomly or based on rules or determinations made by a machine learning model. Advantageously, the inventors have found that injecting noise or uncertainty into the filter selection process can improve poisoning detection and resistance to evasion techniques. For example, different filters can be selected each time training data is analyzed, such that a malicious actor cannot accurately or reliably predict which filters will be used for a particular verification run, thereby making it more difficult for malicious actors to successfully evade detection. Additionally, when multiple techniques are used to detect poisoned data, the likelihood of identifying poisoned data can increase, as poisoned data that is not detected using one technique may be detected using another technique. For example, concealment techniques that are effective against one technique may not be effective against another.

In some implementations, when multiple filters are used, each filter can output an integrity subscore, and a system can be configured to determine an overall integrity score for a dataset. The overall score can be determined by, for example, averaging the subscores or by selecting the lowest subscore. Selecting the lowest subscore can be advantageous because it can indicate potentially compromised data even when other filters fail to detect that the data is compromised but may also produce more false positives than averaging.

In some implementations, models are assigned sensitivity levels. The sensitivity level of a model can be based on the types of data processed by the model, decisions made by the model, a learning rate of the model, and so forth. For example, a model that is used to determine sentiment from text or voice can be assigned a lower sensitivity level than a model used to make medical or financial decisions. As another example, a model that processes sensitive financial or medical information can be assigned a higher sensitivity level than a model that processes, for example, advertisement engagement data. The number of techniques, types of techniques, or both that are applied to candidate training data can vary depending upon the sensitivity level. For example, techniques that are more complex or that have heavier computational loads can be reserved for candidate training data being considered for use training models with relatively high sensitivities.

In some implementations, sensitivity levels can be based at least in part on a learning rate of the model. Machine learning rate controls the pace at which a model changes. High learning rates can result in more rapid changes to the model. Learning rates can be set in various ways. For example, a model can have a fixed learning rate, a decaying learning rate (e.g., stepwise decay, exponential decay, polynomial decay), a cyclical learning rate, or an adaptive learning rate. When a model has a relatively low learning rate, the model can change more slowly with each training cycle, and thus poisoned data may have a smaller effect as compared to if the model had a higher learning rate. Thus, a model with a relatively low learning rate can have a lower sensitivity level than a similar model with a higher learning rate.

In some implementations, candidate training data can be assigned a baseline trust level. For example, candidate training data that is provided by a known source and is tightly controlled can be assigned a higher baseline trust level than candidate training data that is not tightly controlled. Examples of such data can include data scraped from publicly accessible web pages, prompts received from users interacting a large language model, and so forth, which may be more easily manipulated than data that is controlled by a single trusted source. As described herein, candidate training data can be obtained from a variety of sources. For example, candidate training can originate from customers or users who make use of a machine learning model or can come from third party sources that publish or sell data. As an example, a model that is trained for computer security applications can utilize data provided by third parties, such as CVE® and ATT&CK® data published by MITRE®. In some cases, training data can be in the form of premade datasets. In other cases, training data can be obtained by, for example, scraping websites.

In some implementations, candidate training data can be assigned an integrity level based on the results of the evaluation performed by the filtering layer. If the integrity level is above a threshold integrity value, the candidate training data can be used to train a machine learning model. If the integrity level is below the threshold value (for example, indicating that the candidate training data may be poisoned), the candidate training data may not be used for training the algorithm or may undergo further processing, such as removing anomalous or outlier data, before being used for training.

In some implementations, the ingestion of poisoned training data can be mitigated or eliminated. For example, if a particular site or service is providing poisoned data (e.g., due to being hijacked), ingestion from that site or service can be temporally or permanently disabled. When user interactions are the source of poisoned data, a system can block data coming from certain IP addresses, rate limit requests from certain IP addresses, and so forth. In some embodiments, requests can be processed but not used for training.

As described herein, in some cases, only some data in a candidate training dataset may be corrupted. For example, if data is sourced from prompts submitted to a large language model, much of the data may be useful for training, while a relatively small number of users may be submitted poisoned data. It can be desirable to remove poisoned records while retaining the rest of the records and using the remaining records for model training. In some embodiments, a system can be configured to identify a source of poisoned records. For example, poisoned records may originate from one IP address or a collection of IP addresses, and data submitted from those IP addresses can be removed from a dataset prior to training a machine learning model.

While described herein largely in the context of training machine learning models, it will be appreciated that the data verification techniques described herein are not limited to model training applications. Rather, the techniques herein can be used in any circumstance where it is important to verify the provenance and/or content of a dataset.

The techniques described herein can be used in a wide variety of circumstances, such as to protect models used for financial transactions or to protect models used in evaluating security of platforms, systems, applications, and so forth.

Given the complexity of differing security vulnerability threat vectors included in security vulnerability descriptions, end-users of software applications are often unable to determine whether a particular software application is secure or otherwise safe to use. For example, end-users often take for granted that an application made available from a trusted entity (e.g., service provider, software developer, corporation, company, open source developer, etc.) does not include security vulnerabilities that may make the user's sensitive data prone to a data leak, man-in-the-middle attack, or other security vulnerabilities/attacks. However, as malicious entities continue to test these software applications and the computing platforms or systems that interact with such applications by penetration testing or other security exploit discovery techniques, oftentimes such malicious entities discover new security vulnerabilities and may exploit them leaving user data prone to being stolen. As such, end-users of software applications may not have accurate or up-to-date information as to whether a software application they intend to use is impacted by a security vulnerability as attackers are continually implementing newly discovered exploits in real-time or near real-time.

Additionally, although software development teams developing software applications for end-users typically test their applications for such security vulnerabilities, these testing methods are generally limited due to time and cost. This combined with platform updates (e.g., cloud-based service provider updates, operating system updates, or other platform-related updates) often create/uncover new security vulnerabilities. Additionally, software developers often utilize third-party libraries and other third-party code in their software. This third-party code may change over time and, if such third-party libraries are updated over time, the security landscape of a software application may change over time even if the developer has not made changes to their own code. Although third-party security entities may provide information related to newly discovered cybersecurity threats (e.g., security vulnerabilities, threat vectors, method of possible attack, etc.), such information is often generic and not specific to a given software application being executed on a given platform. In addition to the complex information of these cyber security threats, end-users, as well as software development teams are often unaware of how these threat vectors may impact specific aspects (e.g., data storage, cryptographic communications, networking, etc.) of the software they are developing with respect to the specific platform.

Another common issue faced by network engineers is with respect to the security of one or more computing system platforms, such as cloud-based computing system platforms (e.g., cloud-based service providers, cloud computing systems), mobile application platforms (e.g., iOS, Android, Windows), or other computing environments and their interactions with each other. For example, due to the complexity of current computing system architecture involving multiple computing system platforms being interconnected, selecting a computing system platform to build a robust architecture for processing user data is a difficult task given the plethora of security vulnerabilities may be associated with each computing system platform. For instance, when selecting such computing system platforms that may process user data that is transferred from a mobile application of a mobile computing system platform to a cloud-based computing system platform, the network engineer must be aware of security vulnerabilities of each computing system platform. A large level of trust is often involved when selecting computing system platforms and network engineers must currently manually select which computing system platform to choose based on their opinion and what security-related information is available. However, such security information can be unreliable or outdated as new security vulnerabilities are discovered in real-time and/or masked via malicious use of AI, leading to a potential data leak of user data.

Yet another common issue faced by network engineers is with respect to providing accurate indications of security impact information of end-to-end computing systems, individual computing systems, individual software applications, etc. For example, in addition to the complexity of current computing system architectures, one security vulnerability present on a given computing component (e.g., a firewall, load balancer, server, etc.) may be associated or otherwise impact another security vulnerability present on another component (or the same component). Network engineers relying on their subjective opinion have no mechanism to accurately and consistently determine which security vulnerabilities are to be attended to over others, which security vulnerabilities impact other vulnerabilities, or which security vulnerabilities are most threatening or detrimental to user and system data. Although network engineers may perform research and rely on publicly available data concerning security vulnerabilities, updates to hardware or software within a computing system architecture may be updated, nullifying or rather amplifying the threat a given security vulnerability poses. Moreover, a network engineer may want to see at a higher level, which aspects of the computing system may be impacted by security vulnerabilities. For example, although security-vulnerability information may be directed to a single computing system component, that component may be part of a bigger picture (e.g., an aspect, category, or other class of computing system architecture). With no current mechanism to enable users (e.g., network engineers) to quickly and efficiently discover the most threatening security vulnerabilities and which aspects of an end-to-end computing system are impacted, delays in tending to security vulnerabilities may occur.

There is a need for determining, with respect to a given platform and the software being executed on the platform, how specific computing aspects (e.g., assessment domains) are impacted by a particular security vulnerability (or threat vector). There is a further need to convey this information in a user-friendly environment such that end-users are able to quickly and accurately determine whether a software application is safe to use. Moreover, there is a need to predict which computing aspects are impacted by security vulnerabilities (e.g., current security vulnerabilities or future security vulnerabilities) in real-time (or near real-time) to enable end-users to make informed decisions as to whether a software application the user intends to use is safe when new security vulnerabilities are discovered. Existing systems may provide generic security vulnerability-related information to software development teams, however, without determining how the generic security vulnerabilities impact different aspects of a specific platform with respect to the software application, the generic nature of the security vulnerability information is of minimal, if any, value and impact.

To overcome these and other deficiencies of existing systems, the inventors have developed a system for determining (i) what computing aspects of a software application executed on a given platform are impacted based on obtained security vulnerabilities (e.g., from a third-party security entity) and (ii) a visual indication of a level of impact for each computing aspect with respect to security vulnerabilities. For instance, the inventors have developed a specialized model that can determine, from a third-party security entity, security vulnerabilities that are specific to computing aspects of a software application being executed on a given platform. Using the obtained security vulnerabilities, the inventors have developed a method for determining a computing aspect impact level for each computing aspect of the software application with respect to the platform to enable users to make a clear and accurate determination to whether the software application is safe to use. Furthermore, the inventors have developed an improved user interface such that a user can easily identify whether the software application is safe to use based on a graphical representation of each computing aspect impact level with respect to the software application and the platform the software application is being executed on.

The inventors have further developed an improved method for determining comparative real-time end-to-end security vulnerabilities with respect to different infrastructure/architecture components, such as different cloud-based computing platforms, mobile computing system platforms, or other computing system environment components. The method determines a set of computing aspects associated with each respective component being compared (e.g., each cloud-based computing system platform) which can process a network operation in real-time (or near real-time). Using security-specification data and security vulnerability information associated with each component being compared, the system can determine computing-aspect impact levels compared to a comparative standard component being compared (e.g., a standard cloud-based computing system, a model cloud-based computing system, a guideline cloud-based computing system) to generate visual indications of each computing-aspect impact levels for each respective component to enable an easy identification of which component (e.g., cloud-based computing system) to choose. As such, by generating such visual indications, network engineers may select the "best" computing system platform based on up-to-date security vulnerability information to address user-specific requirements, such as to reduce the chance of a data breach of user data.

Due to the sheer number of variations of computing system platform-related security vulnerability information, there is a large amount of time spent attempting to identify how respective computing aspects are impacted by these complex combinations. For example, the hardware and software components that are associated with a given computing system platform may each be associated with their own respective security vulnerabilities which must be considered individually as well as how they impact one another when integrated with other computing system platforms. Furthermore, computer processing and memory resources are often wasted trying to identify how these computing aspects are impacted as existing systems and methods often rely on the software developer to perform hours-worth of research on the Internet, which leads to an increase in network traffic, an increase in computing memory required to process such requests, and wastes computer processing resources that could otherwise be available for other tasks, such as software development.

Additionally, as security vulnerabilities may be discovered in real-time by attackers, penetration testers, or hackers, security vulnerability information can be outdated, leading to the unidentified security vulnerabilities propagating throughout a given platform (e.g., a cloud-based computing system platform, cloud-based service provider, software application, mobile computing system platform, or other computing environment) for a long period of time, causing user data to be prone to a data breach or malicious software being installed to affect secure systems. Moreover, even when information is obtained with respect to each software application, platforms the software applications are executed on, the hardware and software components that control (or otherwise associated with the functions related to the software application), and the security vulnerabilities (e.g., of the hardware components, software components, and the platform), such information is often not in an easily understood format that may provide an overall "picture" of the end-to-end software application "health." This may lead to the software developer and/or end-user to misinterpret or simply miss any identified security vulnerabilities with respect to the software application due to the plethora of information. Thus, by optimizing the process in which specific computing aspects are identified in relation to a software application being executed on a given platform, determining a level of impact for each computing aspect, and providing a visual indication of such impact levels, the amount of computer processing and memory resources are decreased, as well as improving an end-user's understanding of the security of a software application they intend to use.

In various implementations, the methods and systems described herein can generate an improved graphical layout indicating computing-aspect-specific impact levels (e.g., as related to a software application and the platform the software application is being executed on) to indicate to an end-user a security profile associated with a software application in real-time. For example, a computing-aspect-mapping structure can be used to identify a set of computing aspects associated with a software application and the platform that the software application is being executed on. A set of security-vulnerability descriptions related to the platform (e.g., obtained by a security entity) is then obtained to determine a threat value for each security-vulnerability descriptions by using a platform-specific policy that indicates security impact information related to the security-vulnerability descriptions. Computing aspect impact levels for each computing aspect associated with the platform can be determined using the determined threat value for each security-vulnerability description. A graphical layout can then be displayed at a user interface, where the graphical layout comprises a graphical representation of each computing aspect impact level of each respective computing aspect of the set of computing aspects associated with the platform.

In various implementations, the methods and systems described herein can generate an improved graphical layout indicating overall-computing aspect impact levels for associated computing aspects of one computing system platform with respect to a comparative computing system platform to indicate to a user (e.g., end-user, network engineer, or system administrator) that a given computing system platform is secure. For example, the system can detect a user interaction at a webpage for a network operation, where the network operation indicates a processing of data from one computing system platform to a set of other computing system platforms. The system can determine a first set of computing aspects associated with each computing system platform of the set of computing system platforms (e.g., the other computing system platforms) based on the processing of the network operation to obtain security-related information in real-time (or near real-time). The system then identifies a set of comparative computing system platform computing aspects (e.g., to compare each computing system platform to) to determine how one computing system platform "measures up" to a standard computing system platform. The system can then determine overall-computing aspect impact level for associated (e.g., corresponding, matching, or otherwise similar) computing aspects of the comparative computing system platform computing aspects. The system can then generate at a GUI, a graphical layout indicating a graphical representation of each computing aspect impact level for each respective computing system platforms' computing aspect of the set of computing aspects to enable users to easily identify that a given computing system platform is secure and safe to use.

In the following description, for the purposes of explanation, numerous specific details are set forth in order to provide a thorough understanding of implantations of the present technology. It will be apparent, however, to one skilled in the art that implementation of the present technology can practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

System Overview

FIG. 1 is a block diagram showing an illustration of components used to determine platform-specific end-to-end security vulnerabilities and a graphical layout for displaying the platform-specific end-to-end security vulnerabilities via a Graphical User Interface (GUI). In various implementations, system 100 can provide a software security label 106. The software security label 106 can display information in a graphical layout that is related to end-to-end software security of a platform-specific software application. For instance, end-to-end software security of a platform-specific software application may refer to the security measures (e.g., networking security mitigation techniques, networking security protection systems, etc.), security vulnerabilities (e.g., security threats, threat vectors, etc.) or other security information of a software application being executed on or with respect to a particular platform. As a software application may be executed on a variety of platforms, where each platform uses a combination of hardware components (and software components installed on the hardware) to host/run the software application, it is advantageous to understand the security of a given software application and whether the software application is safe to use. Logical component 102 can aggregate and analyze data from data sources/sub-models (e.g., agents 104) to generate for display a software security label 106 at a graphical user interface (GUI). Logical component 102 can be one or more of: a data model, a machine learning model, a computer program, or other logical components configured for receiving, transmitting, analyzing, or aggregating application- and/or processing-related data. Logical component 102 can analyze data received from agents 104 and generate a software security label for an end-user (e.g., a user, customer, unskilled user) to convey in an easily understood format whether a software application is safe to use. In some implementations, agents 104 can be a variety of data sources. For example, agents 104 can represent data obtained from one or more third parties (e.g., third-party security entities). Such third-party data sources may represent industry trusted globally accessible knowledge databases of adversary tactics and techniques that are based on real-world observations of security threats of various platforms and computer software. In some implementations, agents 104 can also be one or more machine learning models, deep-learning models, computing algorithms, or other data models configured to output security-related information of a platform and/or computer software. Logical component 102 can analyze data received by agents 104 to generate a graphical representation of end-to-end software security health such that an end-user (or alternatively, a software developer) can easily understand the safety of a software application being executed on a given platform.

Suitable Computing Environments

Figure 2:
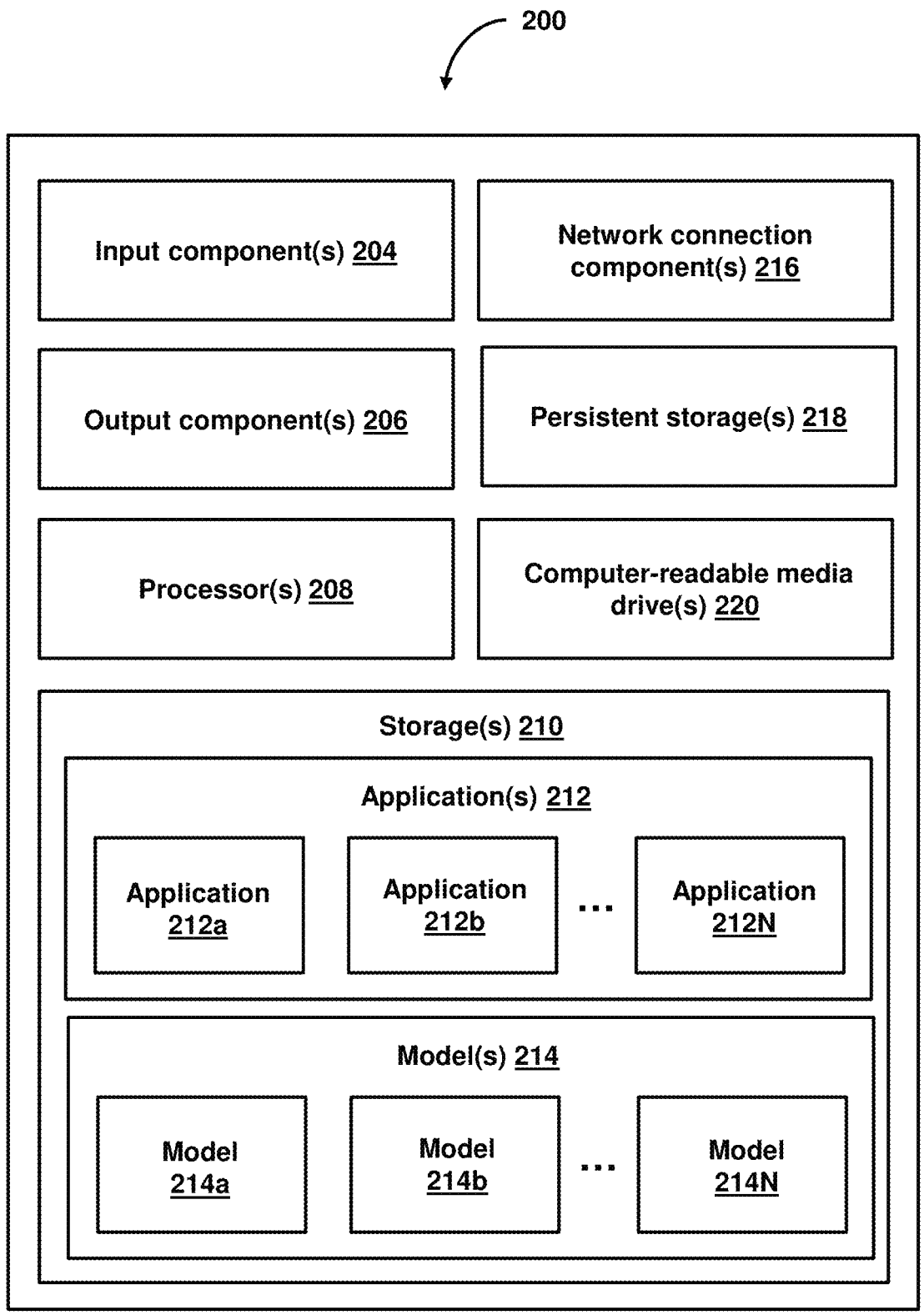
FIG. 2 is a block diagram showing some of the components typically incorporated in at least some of the computer systems and other devices on which the disclosed system operates.

FIG. 2 is a block diagram showing some of the components typically incorporated in at least some of the computer systems and other devices on which the disclosed system operates. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, touch screens, track pads, mice, CD drives, DVD drives, 3.5 mm input jack, HDMI input connections, VGA input connections, USB input connections, or other computing input components; output components 206, including display screens (e.g., LCD, OLED, CRT, etc.), speakers, 3.5 mm output jack, lights, LED's, haptic motors, or other output-related components; processor(s) 208, including a central processing unit (CPU) for executing computer programs, a graphical processing unit (GPU) for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility may be implemented using devices of various types and configurations, and having various components.

Figure 3:
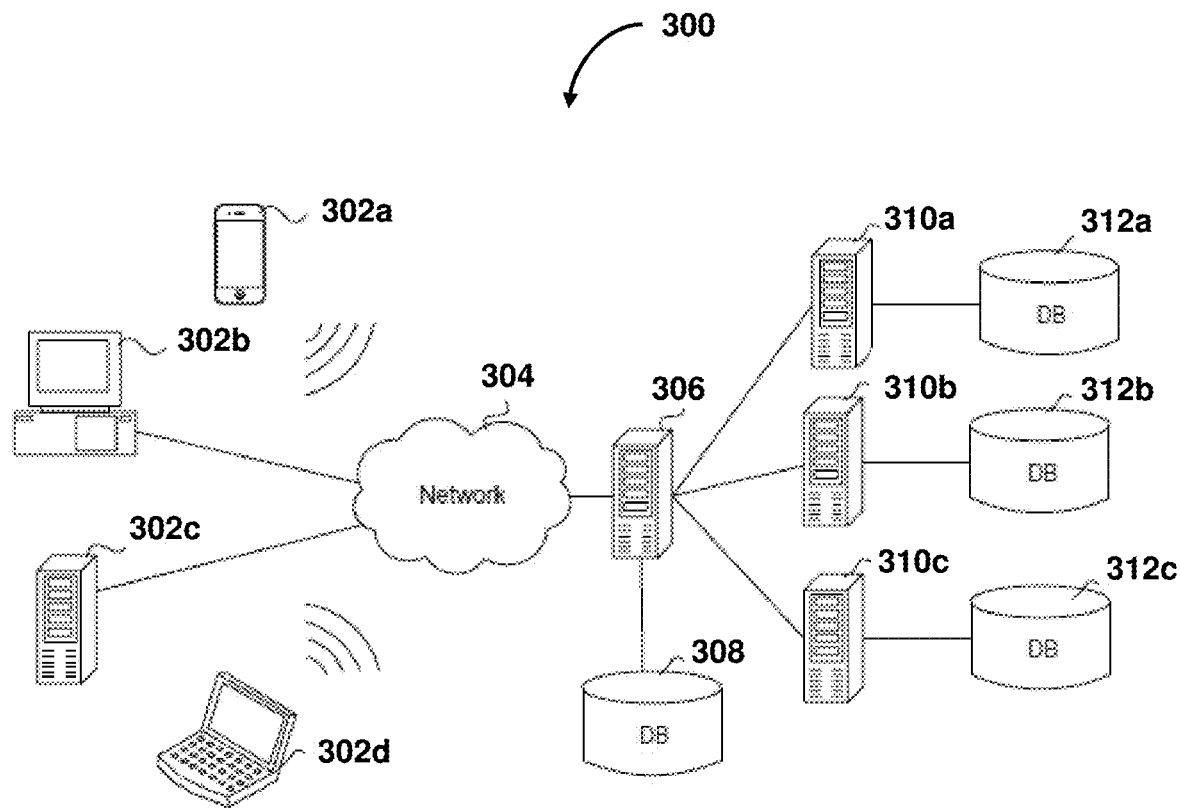
FIG. 3 is a system diagram illustrating an example of a computing environment in which the disclosed system operates in some implementation.

FIG. 3 is a system diagram illustrating an example of a computing environment in which the disclosed system operates in some implementation. In some implementations, environment 300 includes one or more client computing devices 302a-d, examples of which can host the system 100. For example, the computing devices 302a-d can comprise distributed entities a-d, respectively. Client computing devices 302 operate in a networked environment using logical connections through network 304 to one or more remote computers, such as a server computing device. In some implementations, client computing devices 302 may correspond to device 200 (FIG. 2).

In some implementations, server computing device 306 is an edge server which receives client requests and coordinates fulfillment of those requests through other servers, such as servers 310a-c. In some implementations, server computing devices 306 and 310 comprise computing systems, such as the system 100. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310a-c) connect to a corresponding database (308, 312a-c). As discussed above, each server 310 can correspond to a group of servers, and each of these servers can share a database or can have its own database. Databases 308 and 312 warehouse (e.g., store) information such model data, training data, test data, validation data, one or more machine learning models, predefined ranges, predefined thresholds, error thresholds, graphical representations, computing-aspect-mapping structures (e.g., assessment-domain-mapping data structure), data structures, platform identifiers, software application identifiers, security-vulnerability descriptions (e.g., security-vulnerability responses, security threats, security attack vectors, tactics, techniques, and procedures), computing-aspect identifiers (e.g., assessment-domain identifiers), platform-specific policies, mathematical formulas (e.g., weighted average, weighted sum, or other mathematical formulas), graphical elements (e.g., colors, shapes, text, images, multimedia), system protection mechanisms, networking routes, network processing routes, mitigated threat values, mitigated-computing-aspect-impact levels, computing-aspect-specific-impact levels, industry standard scoring standards, predetermined security threat values, received agent 104 information (FIG. 1), or other information.

The one or more machine learning models can include supervised learning models, unsupervised learning models, semi-supervised learning models, and/or reinforcement learning models. Examples of machine learning models suitable for use with the present technology include, but are not limited to: regression algorithms (e.g., ordinary least squares regression, linear regression, logistic regression, stepwise regression, multivariate adaptive regression splines, locally estimated scatterplot smoothing), instance-based algorithms (e.g., k-nearest neighbor, learning vector quantization, self-organizing map, locally weighted learning, support vector machines), regularization algorithms (e.g., ridge regression, least absolute shrinkage and selection operator, elastic net, least-angle regression), decision tree algorithms (e.g., classification and regression trees, Iterative Dichotomiser 3 (ID3), C4.5, C5.0, chi-squared automatic interaction detection, decision stump, M5, conditional decision trees), decision engines, rules engines, Bayesian algorithms (e.g., naïve Bayes, Gaussian naïve Bayes, multinomial naïve Bayes, averaged one-dependence estimators, Bayesian belief networks, Bayesian networks), clustering algorithms (e.g., k-means, k-medians, expectation maximization, hierarchical clustering), association rule learning algorithms (e.g., apriori algorithm, ECLAT algorithm), artificial neural networks (e.g., perceptron, multilayer perceptrons, back-propagation, stochastic gradient descent, Hopfield networks, radial basis function networks), deep learning algorithms (e.g., convolutional neural networks, recurrent neural networks, long short-term memory networks, stacked auto-encoders, deep Boltzmann machines, deep belief networks), dimensionality reduction algorithms (e.g., principle component analysis, principle component regression, partial least squares regression, Sammon mapping, multidimensional scaling, projection pursuit, discriminant analysis), time series forecasting algorithms (e.g., exponential smoothing, autoregressive models, autoregressive with exogenous input (ARX) models, autoregressive moving average (ARMA) models, autoregressive moving average with exogenous inputs (ARMAX) models, autoregressive integrated moving average (ARIMA) models, autoregressive conditional heteroskedasticity (ARCH) models), blackboard machine learning models, and ensemble algorithms (e.g., boosting, bootstrapped aggregation, AdaBoost, blending, stacking, gradient boosting machines, gradient boosted trees, random forest).

In various implementations, the one or more machine learning models can be trained on training data or a training set (discussed in more detail below in relation to FIG. 4). The training data or training set can be created by generating pairs of features (e.g., feature vectors) and/or ground-truth labels/values based on any of the data stored in databases 308 and 312. During training, the machine learning models can be adjusted or modified to fit the models to the training data by, for example, adjusting or modifying model parameters, such as weights and/or biases, so as to minimize some error measure (e.g., a difference between a predicted value and an actual/ground-truth value) over the training data. The error measure can be evaluated using one or more loss functions. Examples of loss functions that can be used include, but are not limited to, cross-entropy loss, log loss, hinge loss, mean square error, quadratic loss, L2 loss, mean absolute loss, L1 loss, Huber loss, smooth mean absolute error, log-cosh loss, or quantile loss. The trained machine learning models can then be applied to test data or validation data (e.g., holdout dataset) to generate predictions (e.g., predicted values or labels). The test data or validation data can also come from data that is stored in databases 308 and 312 (e.g., unlabeled data to generate predictions for). In some implementations, the machine learning models can be retrained to further modify/adjust model parameters and improve model performance. The machine learning models can be retrained on existing and/or new training data, training data, or validation data so as to fine-tune the model parameters to better fit the data and yield a different error measure over the data (e.g., further minimization of the error, or to increase the error to prevent overfitting). More specifically, the model can be further adjusted or modified (e.g., fine-tuned model parameters such as weights and/or biases) so as to alter the yielded error measure. Such retraining can be performed iteratively whenever it is determined that adjustments or modifications to the machine learning models are desirable.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 can be a local area network (LAN) or a wide area network (WAN), but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of local, wide area, wired, or wireless network, including network 304 or a separate public or private network.

Machine Learning Model(s)

Figure 4:
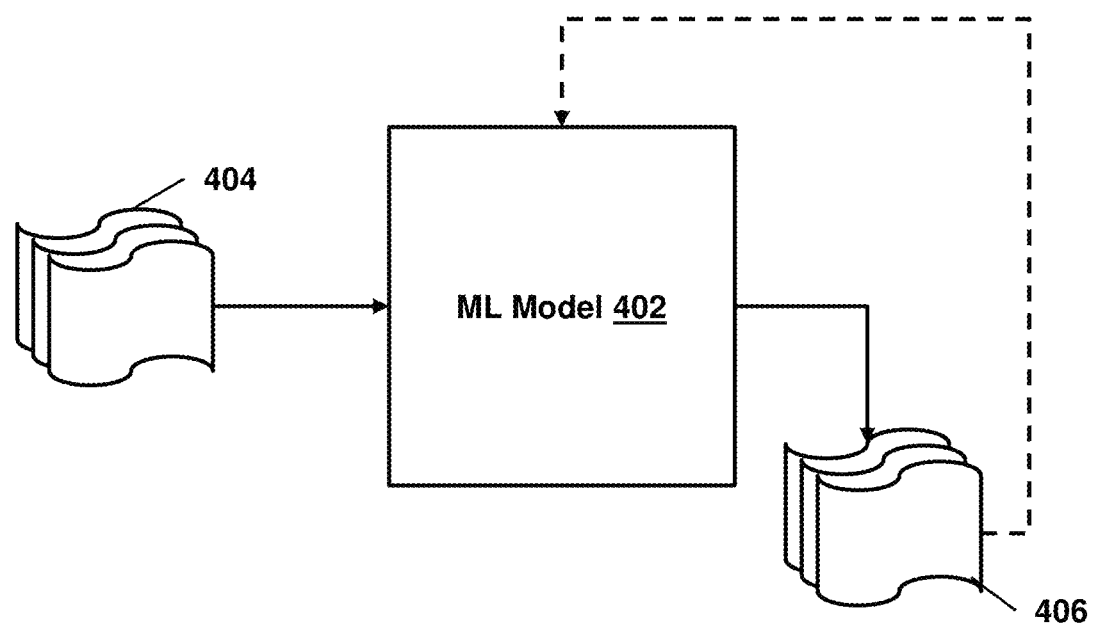
FIG. 4 is an illustrative diagram illustrating a machine learning model, in accordance with some implementations of the present technology.

FIG. 4 is an illustrative diagram illustrating a machine learning model, in accordance with some implementations of the present technology. In some implementations, machine learning model 402 can be part of, or work in conjunction with logical component 102 (FIG. 1). For example, logical component 102 can be a computer program that can use information obtained from machine learning model 402. In other implementations, machine learning model 402 may represent logical component 102, in accordance with some implementations of the present technology.

In some implementations, the machine learning model 402 can include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some implementations, each individual neural unit may have a summation function which combines the values of all its inputs together. In some implementations, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some implementations, neural networks may include multiple layers (e.g., where a signal path traverses from front layers to back layers). In some implementations, back propagation techniques may be utilized by the neural networks, where forward stimulation is used to reset weights on the "front" neural units. In some implementations, stimulation and inhibition for neural networks may be more free flowing, with connections interacting in a more chaotic and complex fashion.

As an example, with respect to FIG. 4, machine learning model 402 can take inputs 404 and provide outputs 406. In one use case, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some implementations, machine learning model 402 can be trained based on information stored in database 308 or database 312 to generate predictions related to mapping platform identifiers to one or more computing aspects. For example, database 308 may include information related to one or more platform identifiers, software application identifiers, security vulnerability information (e.g., security threats, tactics, techniques, and procedures (TTPs), or other security vulnerability information), security protection mechanisms (e.g., firewalls, encryption standards, hardware security module identifiers, communication protocols, system security policy information, or other security protection measure-related information), computing aspect identifiers (e.g., assessment-domain information, etc.) or other information. As an example, machine learning model 402 may be trained on one or more predetermined computing-aspect-mapping structures such that, when new information is provided to the machine learning model as inputs, machine learning model 402 may generate an updated or "new" computing-aspect-mapping structure that indicates a mapping of platforms to computing aspects involved with a processing of network operations. For instance, the computing-aspect-mapping structure can represent a data structure that maps platform identifiers (e.g., a cloud-based platform, a mobile application platform, third-party hosted platform, or other ecosystem of computing resources) to one or more computing-aspects (e.g., assessment domains). For example, the computing-aspect mapping structure may can be a table, graph, directed graph, array, or other data structure configured to include information related to platforms, security vulnerability descriptions, computing aspects, or other information. For instance, the computing-aspect-mapping structure may map platform identifiers to one or more computing aspects involved with a processing of network operations.

Computing-aspects may refer to any aspect of a computing system that is involved in a processing of data. For instance, a computing-aspect may be data storage, cryptography, platform usage, network, remote attestation, or other computing-aspect that is involved during the use of a software application being executed on a platform. Such computing-aspect-mapping structure can be generated to determine which computing aspects are involved with a given platform/software combination. As every software application is executed on a given platform, such as a cloud-based platform, each platform may be associated with a set of hardware and software that forms the "base layer" for a software application (e.g., as developed by one or more software developers) to be executed "on-top" of. Therefore, to accurately determine whether a software application is "safe" to use, it is important to determine which computing aspects are related to a particular platform and how the hardware/software combinations of that particular platform may impact the overall security of the software application being executed on the platform. As such, in some implementations, machine learning model 402 may be configured to generate a computing-aspect-mapping structure that may map one or more platform identifiers to one or more computing-aspects involved with a processing of data (e.g., execution of a software application) to determine a computing-aspect impact level (or assessment-domain impact level) for each computing-aspect associated with the platform.

For example, machine learning model 402 can take a first set of information as input 404. The first set of information can include platform identifiers, security vulnerability descriptions, one or more computing aspects, or other information. For example, the platform identifiers may indicate a respective platform that a software application is associated with (e.g., cloud-based application, mobile application, operating system), an identifier identifying an ecosystem of computing resources associated with the software application, or other platform identifier. The security vulnerability descriptions may indicate security vulnerability information, security threats, security attack vectors, TTPs, or other security vulnerability-related information. In some implementations, the security vulnerability descriptions may be obtained from one or more third-party security entities (e.g., a computing security related entity that provides computing threat related information, such as Mitre® or NIST®). Additionally, the one or more computing aspects may indicate predetermined categories that are related to one or more computing related aspects that are involved with a processing of network operations. As an example, the computing aspects may indicate assessment-domains, indicating a category of a process, procedure, or usage of computing function when data is processed by a computer. For instance, an assessment domain may indicate a "platform usage," "data storage," "network," "cryptography," "remote attestation," or other assessment domain. Such assessment domains may be a predetermined label to an aspect of computer functionalities related to processing network operations.

Machine learning model 402 can take the first set of information as input 404 and generate a computing-aspect-mapping structure as output 406. the computing-aspect-mapping structure may indicate a mapping of computing aspects mapped to one or more platform identifiers. For instance, prior to generating a computing-aspect impact level for each computing aspect associated with a given platform and the software application being executed on the platform, it is advantageous to determine which computing aspects are involved with the given platform. In this way, the system can later use the security vulnerability descriptions to determine how "big" or "how important" a given threat is to a specific computing aspect. Machine learning model 402 can use the security vulnerability descriptions and the platform identifiers to learn associations between the security vulnerability descriptions and the platform identifiers with respect to the predetermined computing aspects to correctly map a security vulnerability to a platform identifier. In some implementations, output 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, a predetermined computing-aspect mapping, or other information).

In some implementations, machine learning model 402 can be trained based on information stored in database 308 or database 312 to generate predictions related determining threat values. As an example, a threat value may be any value indicating a level of a threat. For instance, a threat value may indicate a level of risk associated with a given security vulnerability, security vulnerability description, or other security vulnerability information. Machine learning model 402 can take a second set of information as input 404. The second set of information can include platform identifiers, security vulnerability descriptions, one or more computing aspects, a platform-specific policy, or other information. As an example, the platform-specific policy can indicate security impact information related to security-vulnerability descriptions. For instance, the platform-specific policy can indicate threat-aspects (e.g., threat information included in the security vulnerability descriptions) that are deemed significant to a given entity. The entity may be a service provider, company, corporation, merchant, or other entity. The entity may have a set of rules, procedures, or other guidelines/policies for handling security threats and/or security vulnerabilities that are important to the operation of one or more computing systems related to the entity as well as one or more computing aspects that are important to the one or more computing systems. As such, the platform-specific policy may act as a governing document for a particular computing platform of the entity that is associated with the handling of one or more threats, threat values, or threat mitigation values. In some implementations, the platform-specific policy may include one or more values that are assigned to security vulnerabilities and the respective computing aspects that are associated with the one or more values. As such, machine learning model 402 may use the platform-specific policy to determine or otherwise generate a threat value indicating a "threat level" (e.g., an impact of a security-vulnerability) that is specific to the entity, the associated computing platform of the entity, and the computing aspects associated with the computing platform of the entity. As an example, the entity may include various computing platforms to provide one or more services to an end-user. The entity may "care" more about a particular security vulnerability related to cryptography in a cloud-based platform/environment as opposed to the same vulnerability in a mobile application-based platform/environment. As such, the policy may indicate to give a "higher weight" to the threat value of the security vulnerability related to cryptography in the cloud-based platform/environment and give a lover weight to the same vulnerability in the mobile application-based platform/environment. In some implementations, the threat value may be a quantitative value, such as an integer, percentage, ratio, decimal value, or other quantitative value. In some implementations, the threat value may be a qualitative value, such as "high," "medium," "low," "yes," "no," or other qualitative value.

Machine learning model 402 can take the second set of information as input 404 and generate a threat value of each security vulnerability description as output 406. For instance, the machine learning model 402 can use the platform-specific policy to determine a threat value for each security vulnerability description with respect to each computing aspect of the entity's computing system by learning associations between a platform identifier, the information included in security vulnerability descriptions, the information included in the platform-specific policy, and the one or more computing aspects. In this way, the system may later use the threat values of each security vulnerability descriptions to determine how "big" or "how important" a given threat is to a specific computing aspect that is specific to the computing platform/environment of the entity. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined threat values, or other information).

In some implementations, machine learning model 402 can be trained based on information stored in database 308 or database 312 to generate predictions related determining computing aspect impact levels (e.g., assessment-domain impact levels). For example, machine learning model 402 can take a third set of information as input 404. The third set of information can include platform identifiers, security vulnerability descriptions, one or more computing aspects, a platform-specific policy, one or more impact level measures, or other information. As an example, the one or more impact level measures may indicate how to "measure" or otherwise "generate" a computing aspect impact level. For instance, the impact level measures may indicate one or more algorithms, weights, ratios, values, or mathematical formulas to serve as a basis for generating a normalized impact level. In some implementations, a computing aspect level may be a quantitative value, such as an integer, percentage, ratio, decimal value, or other quantitative value. In some implementations, the computing aspect level may be a qualitative value, such as "high," "medium," "low," "yes," "no," or other qualitative value. As such, machine learning model 402 may use the impact level measure to determine a normalized quantitative or qualitative value for indicating a level of impact with respect to one or more computing aspects.

Machine learning model 402 can take the third set of information as input 404 and generate a computing aspect impact level for each computing aspect of a set of computing aspect as output 406. For instance, the machine learning model 402 can use the impact level measures by learning associations between a platform identifier, the information included in security vulnerability descriptions, the information included in the platform-specific policy, the one or more computing aspects, and the impact level measures. In this way, the system may later use the impact level for each computing aspect of the set of computing aspect that is specific to the computing platform/environment of the entity to generate an easily understood graphical representation of such. By doing so, end-users, as well as software developers, may easily view a software security label to understand whether a software application is at an acceptable risk for use. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined computing aspect impact levels, or other information).

In some implementations, machine learning model 402 can be trained based on information stored in database 308 or database 312 to generate predictions related determining mitigated-computing-aspect impact levels (e.g., mitigated-assessment-domain impact levels). For example, machine learning model 402 can take a fourth set of information as input 404. The fourth set of information can include platform identifiers, security vulnerability descriptions, one or more computing aspects, a platform-specific policy, one or more impact level measures, system protection measure information, mitigated threat values, or other information. As an example, the one or more system protection measure information can indicate information related to a protection system associated with a given platform and software being executed on the platform with respect to an entity. For instance, an entity may employ one or more computing system protection measures to mitigate one or more computing-related threats, attacks, or other computing/network related threats. Such protection measures can include, but are not limited to firewalls, cryptographic communication standards, hardware security modules, honeypots, intrusion detection systems, scareware, proxy servers, software updates, hardware updates, or other cybersecurity related software/hardware protection measures. In some implementations, the system protection measures can be specific to a given platform (e.g., via a platform identifier). For instance, in a cloud-based platform/environment, the entity may employ one or more proxy servers whereas in a mobile-application based platform/environment, a hardware security module may be employed. It should be noted that any combination may exist, and such examples are merely exemplary. In some implementations, each system protection measure may be assigned a predetermined mitigated-threat-value. For example, each system protection measure may be assigned an "offset" value configured to "offset" a threat level of a security vulnerability. For instance, where a known security vulnerability of a cryptographic communication attack vector is known in a cloud-based environment, where an entity is employing a firewall, the threat value associated with the cryptographic communication attack vector may be mitigated. As such, the system may assign the threat value to the mitigated threat value to "lower" the impact level/threat level as the security vulnerability has been mitigated by the firewall. That is, the mitigated threat value level may be lower than that of the threat level currently assigned to the security vulnerability (e.g., as the entity is employing a firewall that has an effect on the attack vector). In some implementations, the mitigated threat value and the mitigated-computing-aspect-impact level may be quantitative values, such as an integer, percentage, ratio, decimal value, or other quantitative value. In some implementations, the mitigated threat value and the mitigated-computing-aspect-impact level may be a qualitative value, such as "high," "medium," "low," "yes," "no," or other qualitative value. As such, machine learning model 402 may use the impact level measure to determine a normalized quantitative or qualitative value for indicating a level of impact with respect to one or more computing aspects.

Machine learning model 402 can take the fourth set of information as input 404 and generate a mitigated threat value and/or mitigated-computing-aspect impact level for each computing aspect of a set of computing aspect, with respect to a security vulnerability as output 406. For instance, the machine learning model 402 may use the system protection measures by learning associations between a platform identifier, the information included in security vulnerability descriptions, the information included in the platform-specific policy, the one or more computing aspects, and the impact level measures, the system protection measures, or other information. In this way, the system may later use the mitigated threat values and the mitigated-computing-aspect impact levels to generate an easily understood graphical representation of mitigated-computing-aspect-impact levels. By doing so, end-users, as well as software developers, may easily view a software security label to understand whether an entity is mitigating any known security vulnerabilities, thereby improving the user experience and increasing user trust. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined mitigated-computing-aspect-impact levels, predetermined mitigated threat values, or other information).

In some implementations, machine learning model 402 can be a blackboard machine learning model. A blackboard machine learning model can represent a blackboard architectural model where a common knowledge base (e.g., the "blackboard") is updated by differing data sources (e.g., agents 104 (FIG. 1)). For instance, the blackboard machine learning model may be configured with a first problem (e.g., generate computing aspect impact levels for a set of computing aspects associated with a platform for a software application). The blackboard machine learning model may use information supplied by the data sources (e.g., one or more agents, interactive agents, interactive models, artificial intelligence models, machine learning models, etc.) to update the blackboard machine learning model with one or more partial solutions. In some implementations, the data sources may "publish" information to the blackboard machine learning model. When publishing information to the blackboard machine learning model, an agent or other data source may obtain information associated with the blackboard machine learning model (e.g., historical information uploaded to the blackboard machine learning model, relevant information associated with the agent, prior partial solutions, etc.) and may update the blackboard machine learning model with new information. As such, the data sources and the blackboard machine learning model work together to solve the first problem. In some implementations, where machine learning model 402 is a blackboard machine learning model, machine learning model 402 may take a fifth set of information as input 404 and generate a computing aspect impact level for each computing aspect of a set of computing aspect as output 406.

As an example, the fifth set of information may include platform identifiers, security vulnerability descriptions, one or more computing aspects, a platform-specific policy, one or more impact level measures, or other information obtained from agents 104 (FIG. 1). For instance, the machine learning model 402 may use the input information (e.g., input 404) to learn associations between the input information (e.g., thereby generating partial solutions), and may also iteratively update the blackboard model based on new input information to generate outputs 406 indicating computing aspect impact levels for each computing aspect of a set of computing aspects associated with the platform. In this way, the system may later use the impact level for each computing aspect of the set of computing aspect that is specific to the computing platform/environment of the entity to generate an easily understood graphical representation of such. By doing so, end-users, as well as software developers, may easily view a software security label to understand whether a software application is safe to use. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined computing aspect impact levels, or other information).

In some implementations, machine learning model 402 can be trained based on information stored in database 308 or database 312 to generate predictions related to generating a set of impacted computing-aspects (e.g., impacted assessment-domains). For example, machine learning model 402 can take a sixth set of information as input 404. The sixth set of information can include platform identifiers, security vulnerability descriptions, one or more computing aspects, one or more impact level measures, set of labeled feature vectors, computing system component identifiers, impacted-computing aspects, or other information. For example, the set of labeled feature vectors may indicate labels of (i) a given security vulnerability, (ii) a given computing system component, and/or (iii) a given impacted computing-aspect. Each feature vector of the set of labeled feature vectors may include a labeled security vulnerability, a labeled computing system component (e.g., identifying information of hardware or software associated with the computing system component), and labeled impacted computing-aspect such that each of the labels correspond to (or are otherwise associated with) one another. The feature vectors may be based on historically derived information indicating which security vulnerabilities affected a given computing system component, and which computing aspect (e.g., of a computing system/platform) was impacted by such. Leveraging this unique and robust training data, machine learning model 402 may be trained to generate accurate predictions determining a set of impacted computing-aspects.

Machine learning model 402 can take the sixth set of information as input 404 and generate a set of impacted computing-aspects as output 406. For instance, the machine learning model 402 may use the sixth set of information to learn associations between security vulnerabilities, computing system components, and impacted computing-aspects to generate a set of impacted computing-aspects when provided a set of security vulnerabilities. In this way, the system may later use generated set of impacted computing-aspects to generate an easily understood graphical representation of impacted computing-aspects, enabling users to quickly identify which aspects of a given computing-system is at risk of a security exploit. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined impacted-computing aspects, or other information).

In some implementations, machine learning model 402 can be trained based on information stored in database 308 or database 312 to generate predictions related generating a set of security mitigation actions. For example, machine learning model 402 can take a seventh set of information as input 404. The seventh set of information can include platform identifiers, security vulnerability descriptions, one or more computing aspects, a platform-specific policy, one or more impact level measures, system protection measure information, mitigated threat values, a second set of labeled feature vectors, or other information. For example, the second set of labeled feature vectors may indicate labels of (i) a given impacted computing-aspect, (ii) a given security vulnerability, and (iii) a given security mitigation action. Each feature vector of the set of labeled feature vectors may include a labeled impacted computing-aspect, a labeled security vulnerability (e.g., security vulnerability descriptions, security vulnerability responses, etc.), and labeled security mitigation action such that each of the labels correspond (or are otherwise associated with) one another. The feature vectors may be based on historically derived information indicating which security vulnerabilities affected a given computing-aspect, and which mitigation actions resolved the computing-aspect's security vulnerability.

The mitigation action may be an action that resolves or inhibits a security exploit related to the security vulnerability. In some implementations, mitigation action(s) may be based on a platform-specific policy that is described later. For example, mitigation action(s) for a platform usage computing-aspect may be "Ensure application detects Root or Jailbreak device and informs/restricts on app launch; Ensure only latest software version supported for app so as to leverage the native benefits and its security updates; ensure on latest software versions supported to align with OS security patches," or other information such as "install software version X.XX." Mitigation action(s) for a data storage computing-aspect may be "Do not store any sensitive data in clear on local device especially under external storage; Ensure application detects Root or Jailbreak device and informs/restricts on app launch; If sensitive data needs to be stored on client, then ensure encrypted storage is implemented; Avoid writing data on external storage due to global accessibility; Use clearCache to delete any sensitive data stored through webview; Explicitly mark allowBackup, debuggable as false," or other mitigation actions. Mitigation action(s) for a cryptography computing-aspect may be "Ensure application uses only entity approved encryption/signing/hashing methods; Only standard and approved protocols should be used to exchange symmetric keys between client app and server for secure communication; Ensure signature generation on client should leverage SE/TEE only; Ensure app does not rely on symmetric cryptography with hardcoded keys as sole method of encryption; Ensure app does not re-use the same cryptographic key for multiple purposes; All random values generated using a secure random number generator," or other mitigation actions. Mitigation actions for a computing-aspect of network communication may be "enforce HTTPS (TLS) for connections for any domain; Enforce application encryption on top of TLS; App checks invalid certificate and should not be allowed to continue despite a certificate error; Implement whitelisting of domains at app and validation at server; Ensure only entity recommended ciphers are configured; Implement certificate pinning and validation at network change; Implement Certification revocation list checks within app," or other mitigation actions. Mitigation action(s) for a computing-aspect of client code integration may be "ensure no application or third-party library or code are downloaded into application at run time; all dependent SDKs, Frameworks, Libraries should be embedded into application before packaging," or other mitigation actions. It should be noted that not all computing-aspects (e.g., assessment-domains) and mitigation actions for determined security vulnerabilities are disclosed; others exists and those listed above are illustrative.

Machine learning model 402 can take the seventh set of information as input 404 and generate a set of mitigation actions as output 406. For instance, the machine learning model 402 may use the seventh set of information to learn associations between security vulnerabilities, computing system components, impacted computing-aspects, and mitigation actions to generate a set of mitigation actions when provided a set of impacted computing-aspects and a set of security vulnerabilities impacting the respective impacted computing-aspects. In this way, the system may later use generated set of mitigation actions to enable a user to quickly correct security vulnerabilities impacting a given computing system. Additionally or alternatively, the system may later use generated set of mitigation actions to configure a network component to automatically apply one or more mitigation actions to correct security vulnerabilities impacting the computing system/platform, thereby increasing networking and computing security. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined mitigation actions, etc.).

Training Data Integrity

As described herein, malicious actors can have a strong motivation to interfere with data sources used to train machine learning models. Such interference can occur in various ways, such as man-in-the-middle attacks, in which an attacker intercepts communications between a client and server and interferes with data during transmission, modification by malware installed on a client device, intentional manipulation of records in a training dataset, and so forth. In some cases, an attacker may compromise a server that makes data available to clients or may take over a site that provides training data when a domain name expires. In some cases, files can be modified by, for example, a router or other networking hardware that is compromised or intentionally designed to intercept and/or modify data during transmission.

Figure 5:
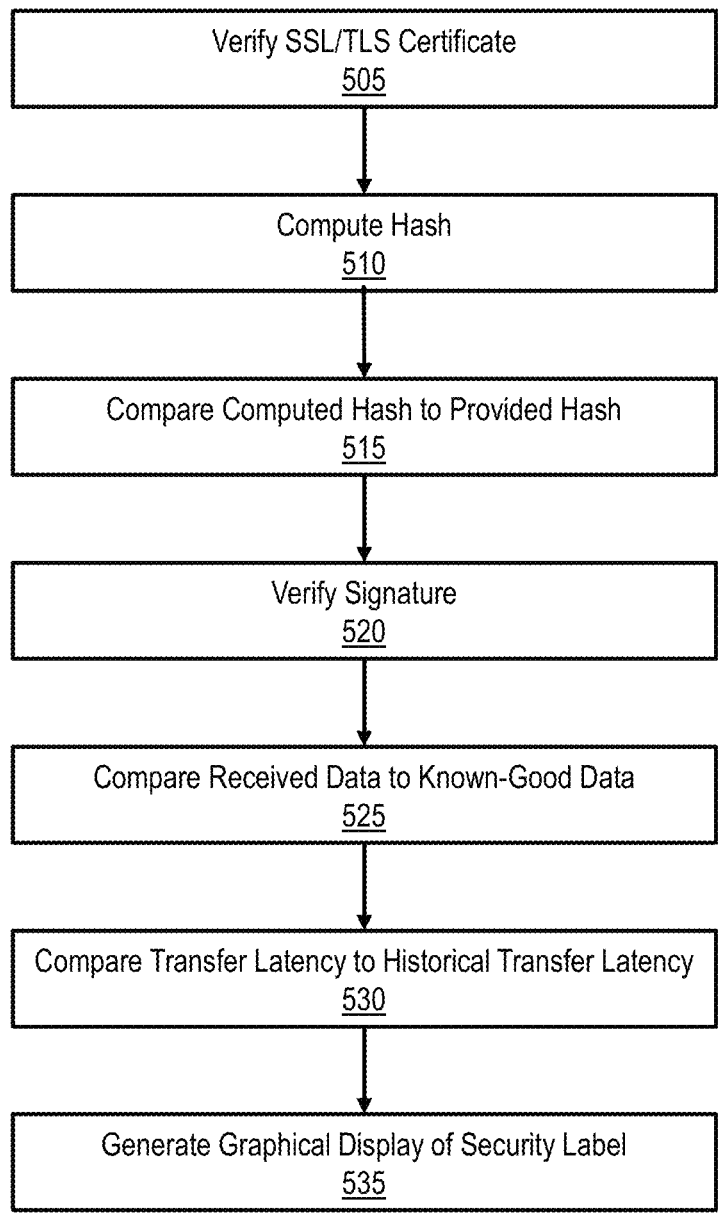
FIG. 5 is a flowchart that illustrates an example process for data provenance checking according to some implementations.

FIG. 5 is a flowchart that illustrates an example process for data provenance checking according to some implementations. At act 505, a system can verify an SSL/TLS certificate of a server that provides the data, for example checking who the certificate is issued to, whether or not the certificate is self-signed, etc. At act 510, the system can compute a hash (e.g., SHA-256 or SHA-512) for a downloaded file and can, at act 515, compare the computed hash to a provided hash, for example a hash provided on a website of a data provider. At act 520, the system can verify a signature of the file. For example, if the file was not signed with the correct private key, verification using the corresponding public key can fail. At act 525, the system can compare received data to known-good data, for example to a previous version of the data to identify any changes that can be indicative of tampering. At act 530, the system can compare transfer latency to historical transfer latency, which can indicate that a file was actually delivered from a different server than is typical. At act 535, the system can generate a security label that can be displayed to a user. In some implementations, other filters are applied additionally or alternative. For example, in some implementations, a system checks DNS records to see if a domain's registration information has recently changed.

Not all verification measures may be applicable in all situations. For example, some data sources may provide hashes while others may not, or some may provide signed files while others may not. The particular measures used to verify data integrity thus may vary from data source to data source.

FIG. 6 is a drawing that shows an example security label for data retrieval according to some implementations. The security label 600 can provide an overview that indicates if any problems or deviations were observed with retrieved data. The security label 600 can indicate a severity or risk level associated with problems or deviations. In FIG. 6, three data sources 602a, 602b, and 602c are shown, but there can be more data sources or fewer data sources. Data sources can include, for example, CVE data or any other data as described herein. Various criteria can be shown in the security label 600. For example, in FIG. 6, the security label shows an overall score 604a, a hash subscore 604b, a signature subscore 604c, a latency subscore 604d, and a comparison subscore 604e. In some implementations, the overall score can be computed from the subscores. For example, the overall score can be an average of the subscores. In some implementations, the overall score can be based on the worst (e.g., highest risk) subscore. In some implementations, scores and subscores can be represented numerically. In some implementations, scores and subscores can be represented categorically, for example using shapes and/or colors, as shown in FIG. 6, or using words (e.g., "High," "Medium," and "Low"). The security label 600 can include a legend 606 that provides an explanation for the content shown in the security label 600. Each subscore can be represented by an indicator 608. The indicator can be a graphic, color, text, number, letter rating, etc. In some cases, not all subscores may be applicable. For example, in FIG. 6, the data source 602a and 602c do not sign their files, so the signature subscore is not populated with a value. In FIG. 6, no issues were detected with the data source 602a. A transfer from data source 602b showed unusual latency, which could indicate an attempt to tamper with a file in transmission or to provide the file from a different server. The hash for data obtained from data source 602c does not match a hash published by the provider of the data, which indicates a high risk as this could indicate that the file was corrupted in transit or has been tampered with.

Figure 7A:
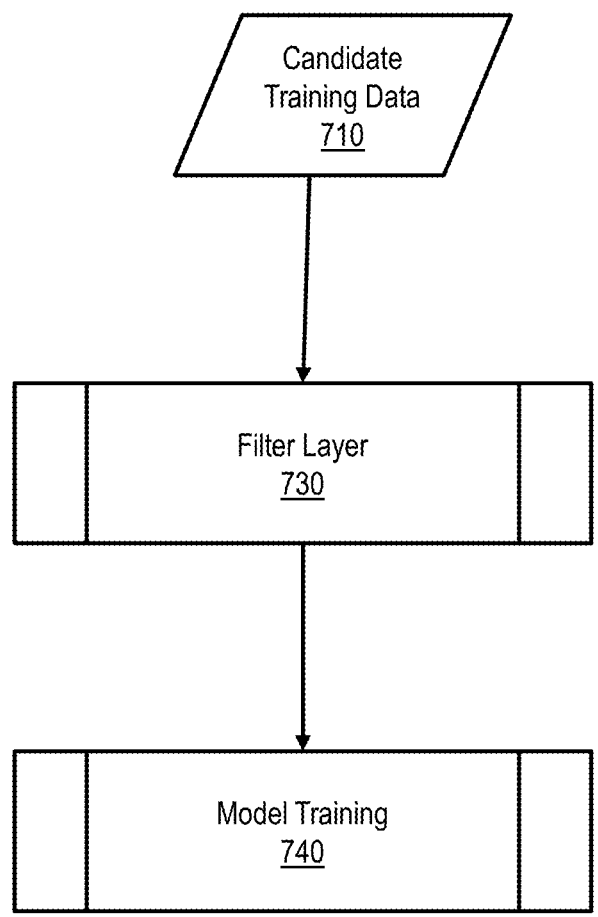
FIG. 7A is a flowchart that illustrates an example process according to some implementations.

As described herein, it can be important to verify not only the provenance of candidate training data but also to verify the contents of the candidate training data. FIG. 7A is a flowchart that illustrates an example process according to some implementations. Candidate training data 710 can be provided to a filter layer 730. The filter layer 730 can include one or more content filters, for example as described herein. The filter layer 730 can be configured such that candidate training data that fails to content testing is not used for model training. If the candidate training data 710 passes the content testing in the filter layer 730, the candidate training data can be used for model training 740.

Figure 7B:
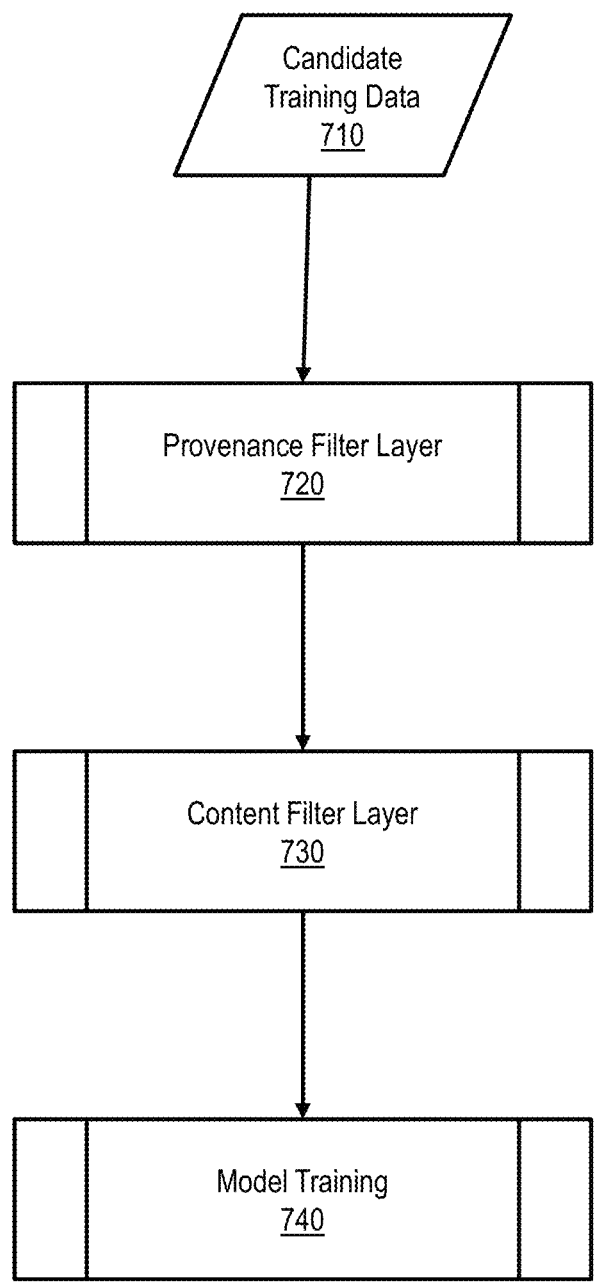
FIG. 7B illustrates another example filtering and training process according to some implementations.

FIG. 7B illustrates another example filtering and training process according to some implementations. FIG. 7B is generally similar to FIG. 7A, except that candidate training data 710 is passed through a provenance filter layer 720. If the candidate training data passes the checks at the provenance filter layer 720, it can then be passed to the filter layer 730, which can be a content filter layer. Such an approach can be desirable because, for example, provenance verification techniques typically have low computational demands as compared with content verification techniques. Data that fails the provenance filters in the filter layer 720 may not undergo more computational content filtering.

Figure 8:
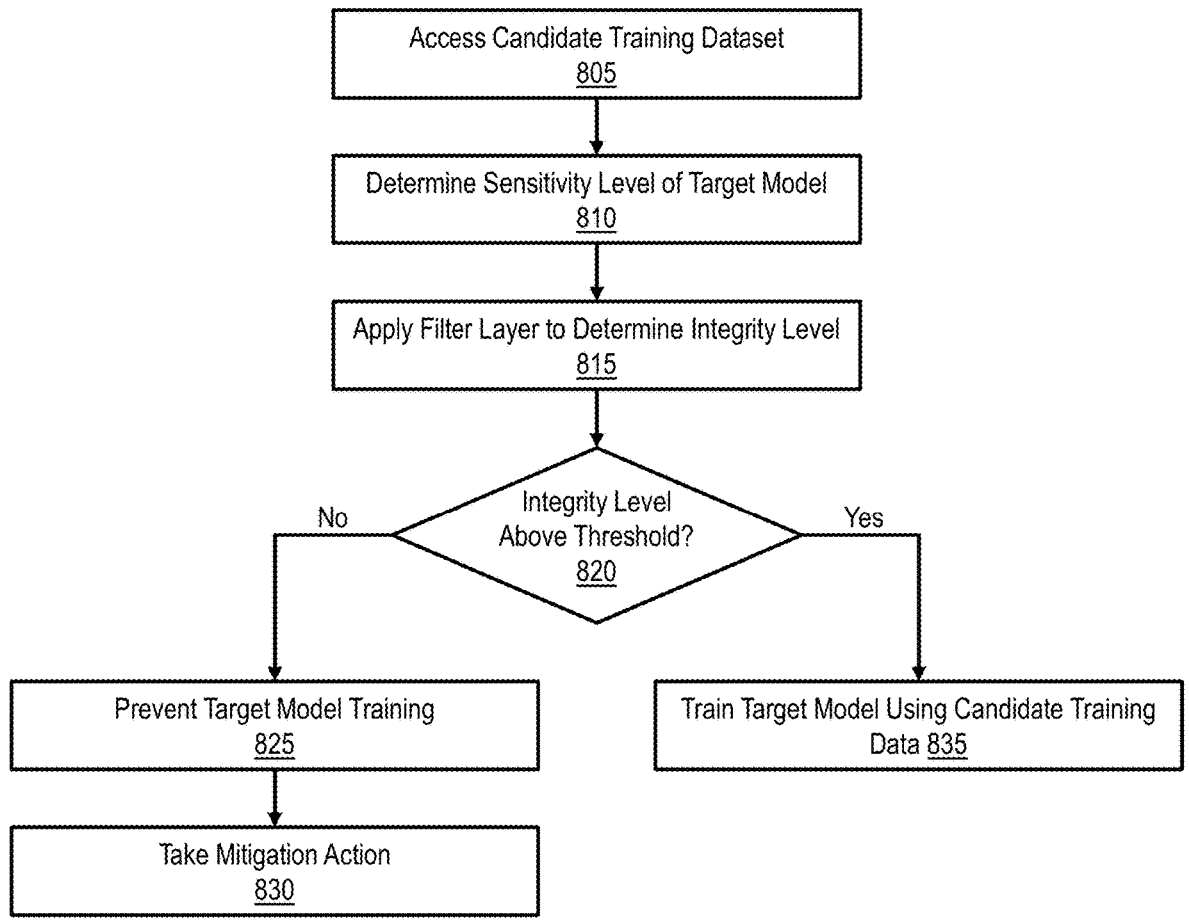
FIG. 8 is a flowchart that illustrates an example training data verification process according to some implementations.

FIG. 8 is a flowchart that illustrates an example training data verification process according to some implementations. At operation 805, a system can access a candidate training dataset. At operation 810, the system can determine a sensitivity level of a target model that could be trained using the candidate training dataset. In some implementations, the security level is predefined. For example, an organization can define a security level for the target model based on the types of data handled, the types of decisions made using the target model, etc. The sensitivity level can determine which filter(s) are applied to the candidate training dataset. At operation 815, the system can apply a filter layer to determine an integrity level of the candidate training dataset. Applying the filter layer can include applying one or more provenance filters, content filters, or a combination of both. At operation 820, the system can determine if the integrity level is above a threshold value. If so, the system can train the target model using the candidate training dataset at operation 835. If not, at operation 825, the system can prevent training of the target model with the candidate training dataset. At operation 830, the system can take a mitigation action, such as blocking the source of the candidate training dataset, blocking a source of records in the candidate training dataset identified as malicious, or preventing future data from the source from being used for training.

Figure 9:
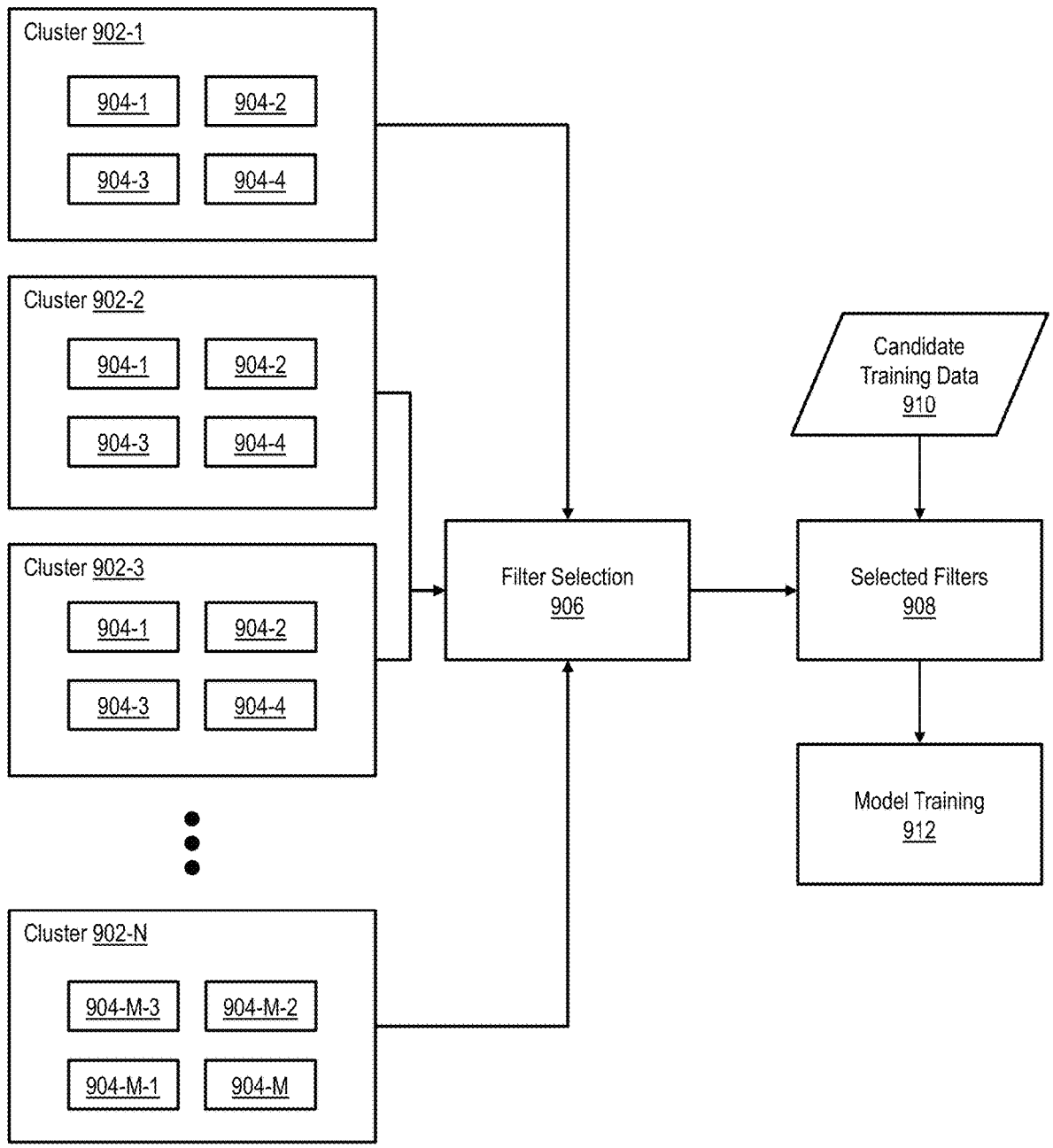
FIG. 9 is a diagram that illustrates an example filter selection and application process according to some implementations.

FIG. 9 is a diagram that illustrates an example filter selection and application process according to some implementations. As shown in FIG. 9, a plurality of M filters 904-1-904-M (individually, filter 904 or collectively, filters 904) can be divided into a plurality of N clusters 902-1-902-N (individually, cluster 902 or collectively, clusters 902). In some implementations, each filter 904 is associated with only one cluster 902, although other implementations are possible. For example, a filter 904 can appear in more than one cluster 902. A filter selection process 906 can select filters 904 to be applied from the clusters 902. The filter selection process 906 can be random, depend on a sensitivity level of a target model, depend on a risk level (e.g., a baseline trust level) associated with training data or a source of the training data, and so forth. The selected filters 908 can be applied to candidate training data 910 and, if the candidate training data 910 passes one or more criteria associated with the selected filters 908, the candidate training data 910 can be used for model training 912.

As described herein, candidate training data can come from many sources and can have many different forms. In some cases, candidate training data can be aggregated across multiple sources. For example, candidate training data can be amassed from a large number of individual users. in such cases, only a small number of the individual users may be attempting to poison a model, while the rest of the candidate training data is suitable for training a model.

Figure 10:
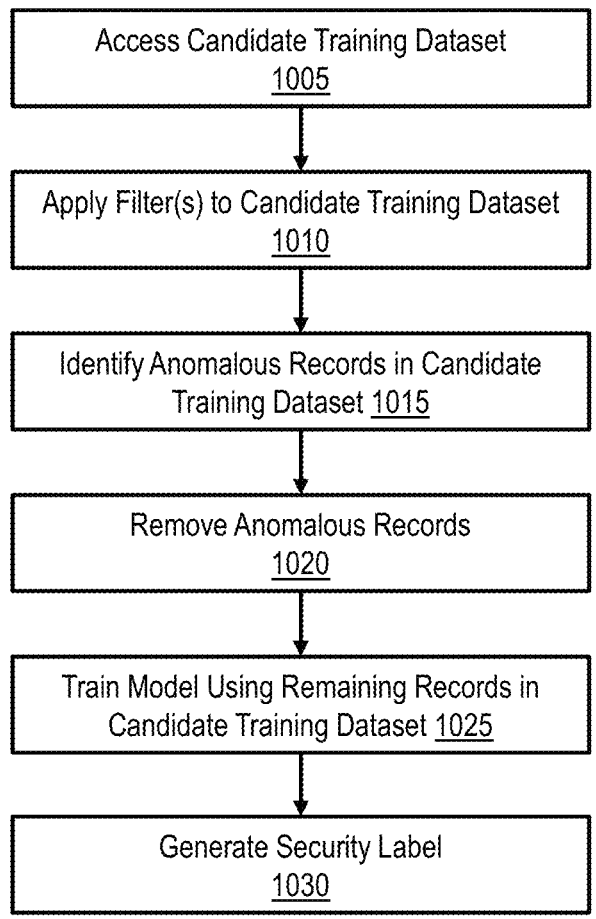
FIG. 10 is a flowchart that illustrates an example process for removing anomalous records from a candidate training dataset according to some implementations.

FIG. 10 is a flowchart that illustrates an example process for removing anomalous records from a candidate training dataset according to some implementations. At operation 1005, a system can access a candidate training dataset. At operation 1010, the system can apply one or more filters to the candidate training dataset. At operation 1015, the system can identify anomalous records in the candidate training dataset. For example, anomalous records can be identified based on statistical methods (e.g., by identifying outliers in the dataset), model-based methods (e.g., by identifying records that do not fit well into known clusters) or by identifying records with large reconstruction errors when an autoencoder is applied). At operation 1020, the system can remove the anomalous records from the candidate training dataset to generate a cleaned training dataset. At operation 1025, the system can train a machine learning model using the cleaned training dataset. At operation 1030, the system can generate a security label. The security label can indicate the risk associated with a dataset before and after anomalous records are removed. An example of a security label is described in more detail herein with reference to FIG. 12.

Figure 11:
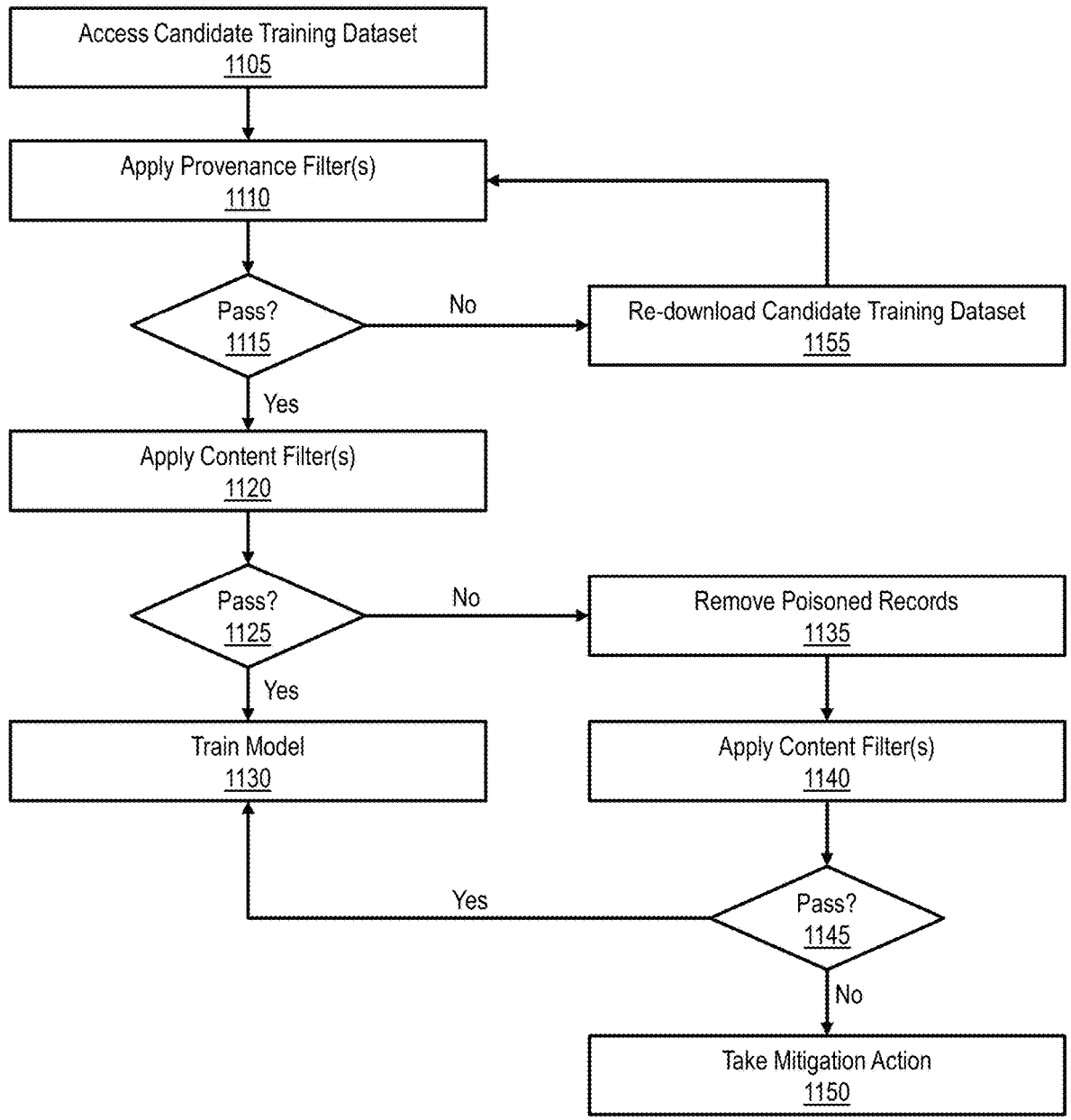
FIG. 11 is a flowchart that illustrates an example data evaluation and training process according to some implementations.

FIG. 11 is a flowchart that illustrates an example data evaluation and training process according to some implementations. At operation 1105, a system can access a candidate training dataset. At operation 1110, the system can apply one or more provenance filters, such as checking a hash value, verifying a signature, or verifying an SSL/TLS certificate. At operation 1115, if the candidate training data fails the provenance filters (e.g., an invalid hash, signature, SSL/TLS certificate), the system can redownload the candidate training dataset at operation 1155 and re-evaluate the candidate training dataset. If the candidate training dataset still fails, the process can stop. In some embodiments, further mitigation actions are taken, such as blocking a source of the candidate training dataset. If, at operation 115, the candidate training dataset passes the provenance filter(s) (e.g., valid hash, signature, SSL/TLS certificate), the process can continue. At operation 1120, the system can apply one or more content filters. The content filters can be selected as described herein. At operation 1125, if the candidate training dataset passes the content filters, a model can be trained at operation 1130 using the candidate training dataset. If the candidate training dataset fails at operation 1125, the system can identify one or more poisoned records in the candidate training dataset at operation 1135 and remove the poisoned records. The system can apply the content filters again at operation 1140. In some implementations, the content filters used at operation 1140 are the same as the content filters used at operation 1120. In some implementations, the content filters used at operation 1140 are different (e.g., all are different or at least one is different) from the content filters used at operation 1120. If, at operation 1145, the cleaned candidate training data passes the content filters, the cleaned candidate training dataset can be used to train the model at operation 1130. If not, the system can take a mitigation action at operation 1150.

FIG. 12 is an example security label according to some embodiments. The security label 1200 indicates assessed and mitigated integrity for poisoning. In FIG. 12, three candidate training datasets 1202a-1202c are illustrated. Integrity is shown for different poisoning types 1204, as well as an overall integrity. The security label 1200 includes assessed integrity 1206a and mitigated integrity 1206b. The assessed integrity 1206a can be the determined integrity level before any cleaning steps are applied. The mitigated integrity 1206b can be the determined integrity level after anomalous records are removed. Indicators 1208 can show a representation of the integrity levels, for example as high integrity, medium integrity, and low integrity, thereby providing an easy way for users to gain an overview of the integrity level of a dataset, the types of poisoning detected in a dataset, etc.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

We claim:

1. A method for training a machine learning model, the method comprising:
　accessing a candidate training dataset for the machine learning model;
　evaluating the candidate training dataset using a first filter layer, wherein evaluating the candidate training dataset using the first filter layer comprises:
　　applying at least one provenance filter to verify a provenance of the candidate training dataset by verifying at least one of: a signature of the candidate training dataset, a hash of the candidate training dataset, or a secure sockets layer/transport layer security (SSL/TLS) certificate of a source of the candidate training dataset; and
　when the provenance of the candidate training dataset is verified:
　　evaluating the candidate training dataset using a second filter layer, wherein evaluating the candidate training dataset using the second filter layer comprises:
　　　determining at least one content filter to apply to the candidate training dataset, wherein the at least one content filter is configured to determine whether the candidate training dataset contains poisoned data;
　　　applying the at least one content filter to the candidate training dataset;
　　　determining, based on applying the at least one content filter to the candidate training dataset, an integrity level of the candidate training dataset;
　　　determining whether the integrity level satisfies a threshold integrity value; and
　　　when the integrity level satisfies the threshold integrity value, training the machine learning model using the candidate training dataset.

2. The method of claim 1, further comprising:
　when the integrity level does not satisfy the threshold integrity value:
　　identifying at least one poisoned data record in the candidate training dataset;
　　removing the at least one poisoned data record from the candidate training dataset to generate a cleaned training dataset;
　　determining, based on applying the at least one content filter to the cleaned training dataset, a second integrity level of the cleaned training dataset;
　　determine whether the second integrity level satisfies the threshold integrity value; and
　　when the second integrity level satisfies the threshold integrity value, training the machine learning model using the cleaned training dataset.

3. A method for training a machine learning model, the method comprising:
　accessing a candidate training dataset for the machine learning model;
　evaluating the candidate training dataset using a filter layer, wherein evaluating the candidate training dataset using the filter layer comprises:
　　determining at least one content filter to apply to the candidate training dataset, wherein the at least one content filter is configured to determine if the candidate training dataset contains poisoned data;
　　applying the at least one content filter to the candidate training dataset; and
　　determining, based on applying the at least one content filter to the candidate training dataset, an integrity level of the candidate training dataset;
　determining if the integrity level satisfies a threshold integrity value; and
　when the integrity level satisfies the threshold integrity value, training the machine learning model using the candidate training dataset.

4. The method of claim 3, further comprising:
　when the integrity level does not satisfy the threshold integrity value:
　　identifying at least one poisoned data record in the candidate training dataset;

removing the at least one poisoned data record from the candidate training dataset to generate a cleaned training dataset;

determining, based on applying the at least one content filter to the cleaned training dataset, a second integrity level of the cleaned training dataset;

determining if the second integrity level satisfies the threshold integrity value; and when the second integrity level satisfies the threshold integrity value, training the machine learning model using the cleaned training dataset.

5. The method of claim 3, wherein determining the at least one content filter comprises:

accessing a set of rules indicating a plurality of content filters and conditions for applying each content filter of the plurality of content filters; and identifying, based on the set of rules, the at least one content filter.

6. The method of claim 5, wherein the conditions are based on one or more of: a type of the machine learning model, a use case of the machine learning model, a type of the candidate training dataset, a source of the candidate training dataset, a sensitivity level of the machine learning model, or a learning rate of the machine learning model.

7. The method of claim 3, wherein determining the at least one content filter comprises determining a plurality of content filters, wherein applying the at least one content filter comprises applying the plurality of content filters, wherein the integrity level is based on an aggregate of integrity level subscores, and wherein each integrity level subscore of the integrity level subscores is determined based on applying a content filter of the plurality of content filters to the candidate training dataset.

8. The method of claim 7, wherein the integrity level is an average of the integrity level subscores.

9. The method of claim 7, wherein the integrity level is a minimum integrity level subscore of the integrity level subscores.

10. The method of claim 7, wherein the plurality of content filters is determined based on at least one of a rule, a random selection, or applying a second machine learning to the candidate training dataset.

11. The method of claim 7, wherein the content filters of the plurality of content filters are selected from a set of content filters, wherein the content filters of the set of content filters are grouped into a plurality of clusters, and wherein the plurality of content filters is selected by:
selecting a first content filter from a first cluster of the plurality of clusters; and
selecting a second content filter from a second cluster of the plurality of clusters,
wherein the second cluster is different from the first cluster.

12. The method of claim 3, further comprising:
when the integrity level does not satisfy the threshold integrity value:
identifying a source of the candidate training dataset; and
mitigating receipt of additional candidate training data from the source.

13. The method of claim 3, wherein the at least one content filter comprises at least one of: a comparison filter configured to compare the candidate training dataset to a previous version of the candidate training dataset; a clustering algorithm configured to cluster records of the candidate training dataset into a plurality of clusters, a feature importance algorithm configured to determine relative weights of a plurality of features included in the records of the candidate training dataset, an outlier detection algorithm, or an autoencoder algorithm configured to determine reconstruction errors associated with records of the candidate training dataset.

14. A method for cleaning training data, the method comprising:

accessing a candidate training dataset for a machine learning model;

evaluating the candidate training dataset using a filter layer, wherein evaluating the candidate training dataset using the filter layer comprises:
determining at least one content filter to apply to the candidate training dataset, wherein the at least one content filter is configured to determine if the candidate training dataset contains poisoned data;
applying the at least one content filter to the candidate training dataset; and
determining, based on applying the at least one content filter to the candidate training dataset, an integrity level of the candidate training dataset;

determining that the integrity level does not satisfy a threshold integrity value;

identifying at least one poisoned data record in the candidate training dataset; and removing the at least one poisoned data record from the candidate training dataset to generate a cleaned training dataset.

15. The method of claim 14, further comprising:
determining, based on applying the at least one content filter to the cleaned training dataset, a second integrity level of the cleaned training dataset; and
determining if the second integrity level satisfies the threshold integrity value.

16. The method of claim 14, wherein determining the at least one content filter comprises:

accessing a set of rules indicating a plurality of content filters and conditions for applying each content filter of the plurality of content filters; and identifying, based on the set of rules, the at least one content filter.

17. The method of claim 14, wherein determining the at least one content filter comprises determining a plurality of content filters, wherein applying the at least one content filter comprises applying the plurality of content filters, wherein the integrity level is based on an aggregate of integrity level subscores, and wherein each integrity level subscore of the integrity level subscores is determined based on applying a content filter of the plurality of content filters to the candidate training dataset.

18. The method of claim 17, wherein the plurality of content filters is determined based on at least one of a rule, a random selection, or applying a second machine learning to the candidate training dataset.

19. The method of claim 18, wherein the content filters of the plurality of content filters are selected from a set of content filters, wherein the content filters of the set of content filters are grouped into a plurality of clusters, and wherein the plurality of content filters is selected by:
selecting a first content filter from a first cluster of the plurality of clusters; and selecting a second content filter from a second cluster of the plurality of clusters,
wherein the second cluster is different from the first cluster.

20. The method of claim 14, wherein the at least one content filter comprises at least one of: a comparison filter configured to compare the candidate training dataset to a previous version of the candidate training dataset; a clustering algorithm configured to cluster records of the candidate training dataset into a plurality of clusters, a feature importance algorithm configured to determine relative weights of a plurality of features included in the records of the candidate training dataset, an outlier detection algorithm, or an autoencoder algorithm configured to determine reconstruction errors associated with records of the candidate training dataset.

* * * * *